(12) United States Patent
Seki

(10) Patent No.: US 9,820,222 B2
(45) Date of Patent: Nov. 14, 2017

(54) WIRELESS COMMUNICATION METHOD, WIRELESS COMMUNICATION SYSTEM, BASE STATION, AND WIRELESS TERMINAL

(71) Applicant: FUJITSU LIMITED, Kawasaki-shi, Kanagawa (JP)

(72) Inventor: Hiroyuki Seki, Kamakura (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/546,593

(22) Filed: Nov. 18, 2014

(65) Prior Publication Data

US 2015/0072692 A1    Mar. 12, 2015

Related U.S. Application Data

(63) Continuation of application No. PCT/JP2012/003382, filed on May 24, 2012.

(51) Int. Cl.
*H04W 52/02*         (2009.01)
*H04W 52/34*         (2009.01)
(Continued)

(52) U.S. Cl.
CPC ... *H04W 52/0206* (2013.01); *H04W 36/0072* (2013.01); *H04W 52/0245* (2013.01);
(Continued)

(58) Field of Classification Search
CPC .... H04B 1/38; H04W 52/143; H04W 52/245; H04W 52/286; H04W 52/0206;
(Continued)

(56) References Cited

U.S. PATENT DOCUMENTS 8,583,192 B2 * 11/2013 Tomita .............. H04W 52/0241
370/332
2003/0119452 A1    6/2003 Kim et al.
(Continued)

FOREIGN PATENT DOCUMENTS

CN    102131272 A    7/2011
EP    2 312 904 A1   4/2011
(Continued)

OTHER PUBLICATIONS

Extended European search report including the supplemental European search report and the European search opinion issued for corresponding European Application No. 12877224.1 dated May 4, 2015.
(Continued)

*Primary Examiner* — Charles Appiah
*Assistant Examiner* — Margaret G Mastrodonato
(74) *Attorney, Agent, or Firm* — Myers Wolin, LLC

(57) ABSTRACT

A wireless communication method includes: transmitting, by a base station, a signal subjected to reduction of transmission power that is reduced compared with specific transmission power of the base station; and giving notice of, by a wireless terminal, when the wireless terminal detects a signal of the base station, a reduction cancellation request to the base station based on information relating to the reduction of the transmission power of the base station and a reception level of the signal of the base station, the reduction cancellation request being used for cancelling the reduction of the transmission power in the base station.

14 Claims, 16 Drawing Sheets

(51) Int. Cl.
*H04W 52/40* (2009.01)
*H04W 36/00* (2009.01)
*H04W 36/16* (2009.01)
*H04W 52/14* (2009.01)
*H04W 52/28* (2009.01)

(52) U.S. Cl.
CPC ......... *H04W 52/34* (2013.01); *H04W 52/343* (2013.01); *H04W 52/40* (2013.01); *H04W 36/165* (2013.01); *H04W 52/143* (2013.01); *H04W 52/282* (2013.01); *Y02B 60/50* (2013.01)

(58) Field of Classification Search
CPC ......... H04W 36/0072; H04W 52/0245; H04W 52/34; H04W 52/343; H04W 52/40; H04W 36/165; H04W 52/282
USPC ........................................ 455/574, 41.2, 423
See application file for complete search history.

(56) References Cited

U.S. PATENT DOCUMENTS

| | | | |
|---|---|---|---|
| 2004/0166899 A1 | 8/2004 | Nakayasu | |
| 2005/0130662 A1 | 6/2005 | Murai | |
| 2008/0220803 A1* | 9/2008 | Lee | H04W 52/245 455/522 |
| 2010/0002614 A1 | 1/2010 | Subrahmanya | |
| 2011/0105200 A1 | 5/2011 | Tomita et al. | |
| 2015/0055462 A1* | 2/2015 | Yamamoto | H04L 47/25 370/230 |

FOREIGN PATENT DOCUMENTS

| | | | | |
|---|---|---|---|---|
| EP | 2 523 509 A1 | 11/2012 | | |
| JP | 2003-188818 A | 7/2003 | | |
| JP | 2004-253932 A | 9/2004 | | |
| JP | 2006-101442 A | 4/2006 | | |
| JP | 2007-514367 | 5/2007 | | |
| JP | 2008-085840 A | 4/2008 | | |
| JP | 2012-065140 A | 3/2012 | | |
| JP | EP 2523509 A1 * | 11/2012 | ........ | H04W 52/0235 |
| WO | 2010/016123 A1 | 2/2010 | | |
| WO | 2011/083832 A1 | 7/2011 | | |

OTHER PUBLICATIONS

3GPP, "3rd Generation Partnership Project; Technical Specification Group Services and System Aspects; Telecommunication management; Study on Energy Savings Managements (ESM) (Release 10)", 3GPP TR 32.826 V10.0.0 (Mar. 2010), issued in Mar. 2010.
International Search Report with Written Opinion of the International Searching Authority for International Application No. PCT/JP2012/003382, dated Aug. 7, 2012, with English Translation.
Second and Supplementary Notice Informing the Applicant of the Communication of the International Application issued for corresponding International Application PCT/JP2012/003382, dated Sep. 25, 2014.
Notification of Receipt of Record issued for corresponding International Application PCT/JP2012/003382, dated Jul. 17, 2012.
Communication pursuant to Article 94(3) EPC issued by the European Patent Office for corresponding European Patent Application No. 12 877 224.1-1855, dated Sep. 22, 2016.
Communication pursuant to Article 94(3) EPC issued by the European Patent Office for corresponding European Patent Application No. 12 877 224.1-1875, dated Mar. 31, 2017.
First Notification of Office Action issued by the State Intellectual Property Office of China for corresponding Chinese Patent Application No. 201280073311.X, dated Jul. 14, 2017, with an English translation.

* cited by examiner

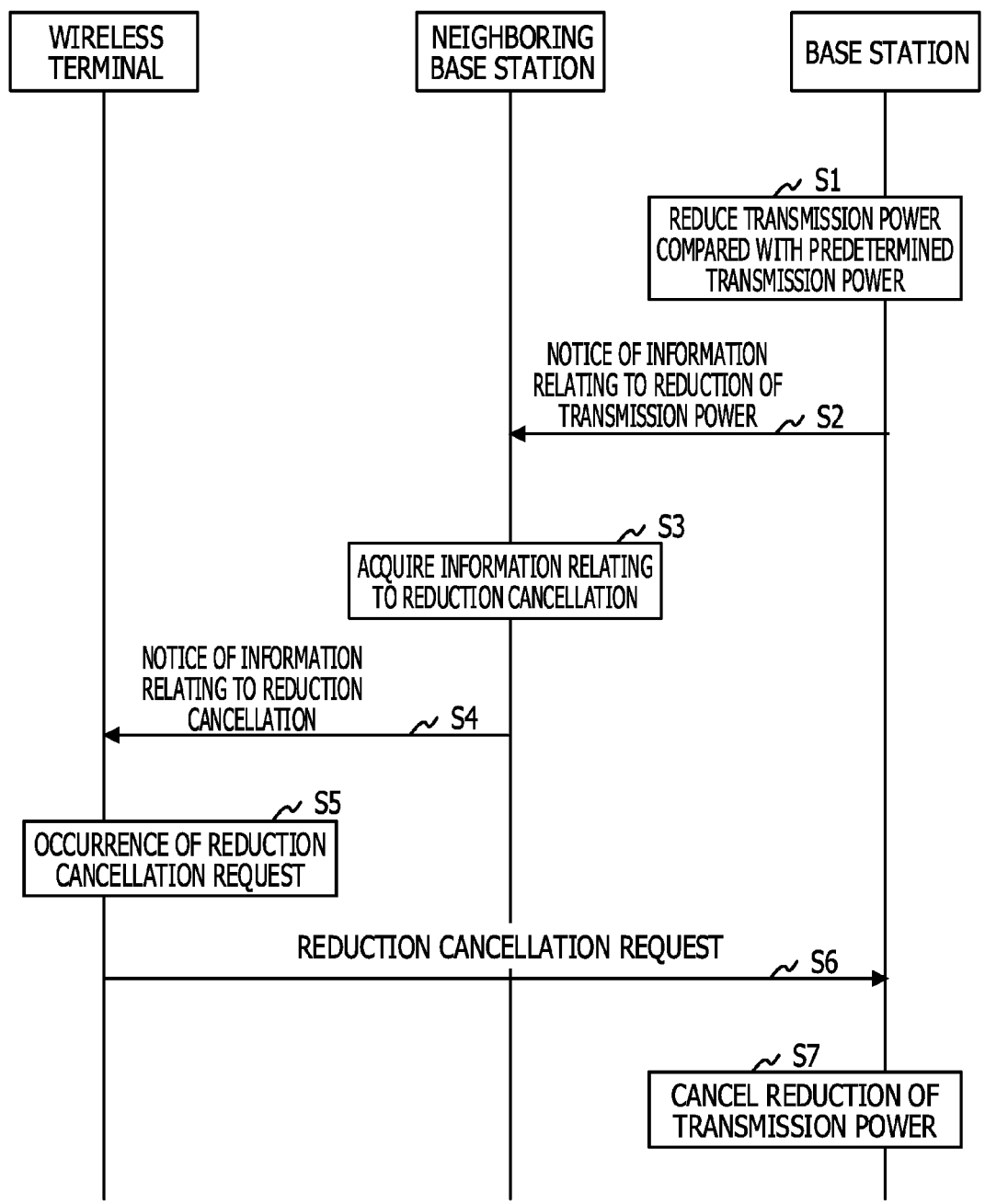

WIRELESS COMMUNICATION METHOD, WIRELESS COMMUNICATION SYSTEM, BASE STATION, AND WIRELESS TERMINAL

CROSS-REFERENCE TO RELATED APPLICATION

This application is a continuation application of International Application PCT/JP2012/003382, filed on May 24, 2012, the entire contents of which are incorporated herein by reference.

FIELD

The present invention relates to a wireless communication method, a wireless communication system, a base station, and a wireless terminal.

BACKGROUND

In recent years, in wireless communication systems such as mobile phone systems, in order to further increase the speed, bandwidth, and so forth of wireless communication, a next-generation wireless communication technology has been discussed. For example, in 3GPP (3rd Generation Partnership Project) serving as a standardization body, a communication standard called LTE (Long Term Evolution) and a communication standard based on the wireless communication technology of LTE and called LTE-A (LTE-Advanced) have been proposed.

In such a wireless communication system, a technique for realizing reduction of power consumption of the entire system has been proposed. In this technique, for example, traffic amounts in the coverage areas of a plurality of base stations are measured by a control station, the transmission power levels of the base stations are decreased or increased or ON/OFF of power supplies thereof is performed in accordance with the traffic amounts or statistical changes in the traffic amounts, and thus, power consumption of the entire system is reduced.

CITATION LIST

Patent Literature

PTL 1: Japanese Laid-open Patent Publication No. 2006-101442

Non Patent Literature

NPL 1: 3GPP TR 32.826 V10.0.0 (2010-03)

SUMMARY

According to an aspect of the invention, a wireless communication method includes: transmitting, by a base station, a signal subjected to reduction of transmission power that is reduced compared with specific transmission power of the base station; and giving notice of, by a wireless terminal, when the wireless terminal detects a signal of the base station, a reduction cancellation request to the base station based on information relating to the reduction of the transmission power of the base station and a reception level of the signal of the base station, the reduction cancellation request being used for cancelling the reduction of the transmission power in the base station.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a sequence diagram for explaining an operation of the wireless communication system according to the first embodiment.

DESCRIPTION OF EMBODIMENTS

Hereinafter, examples of a wireless communication method, a wireless communication system, a base station, and a wireless terminal disclosed in this matter will be described with reference to drawings. In addition, the wireless communication method, the wireless communication system, the base station, and the wireless terminal disclosed in this matter are not limited by the following examples.

While inventing the present embodiments, observations were made regarding a related art. Such observations include the following, for example.

In a wireless communication system of the related art, it is conceivable that, for example, cells of various sizes or various kinds of cells are mixed. At this time, for example, in a base station that forms a cell whose cell radius is relatively small, a case where the number of users (wireless terminals) is small or a case where there is bias in a user distribution is conceivable. Therefore, in a case where, in such manner as described above, the transmission power levels of the base stations are decreased or increased or ON/OFF of power supplies thereof is performed in accordance with the traffic amounts or statistical changes in the traffic amounts, there is a possibility that timing when reduced transmission power or a power supply put into OFF is restored to an original state is not adequately set and it is difficult to effectively perform the reduction of power consumption.

The disclosed technology of the present embodiments is made in view of the above, and one aspect of an object thereof is to provide a wireless communication method, a wireless communication system, a base station, and a wireless terminal which are each capable of swiftly adjusting transmission power of a base station and effectively reducing power consumption of an entire system, in a wireless communication system.

First Embodiment

Figure 1:
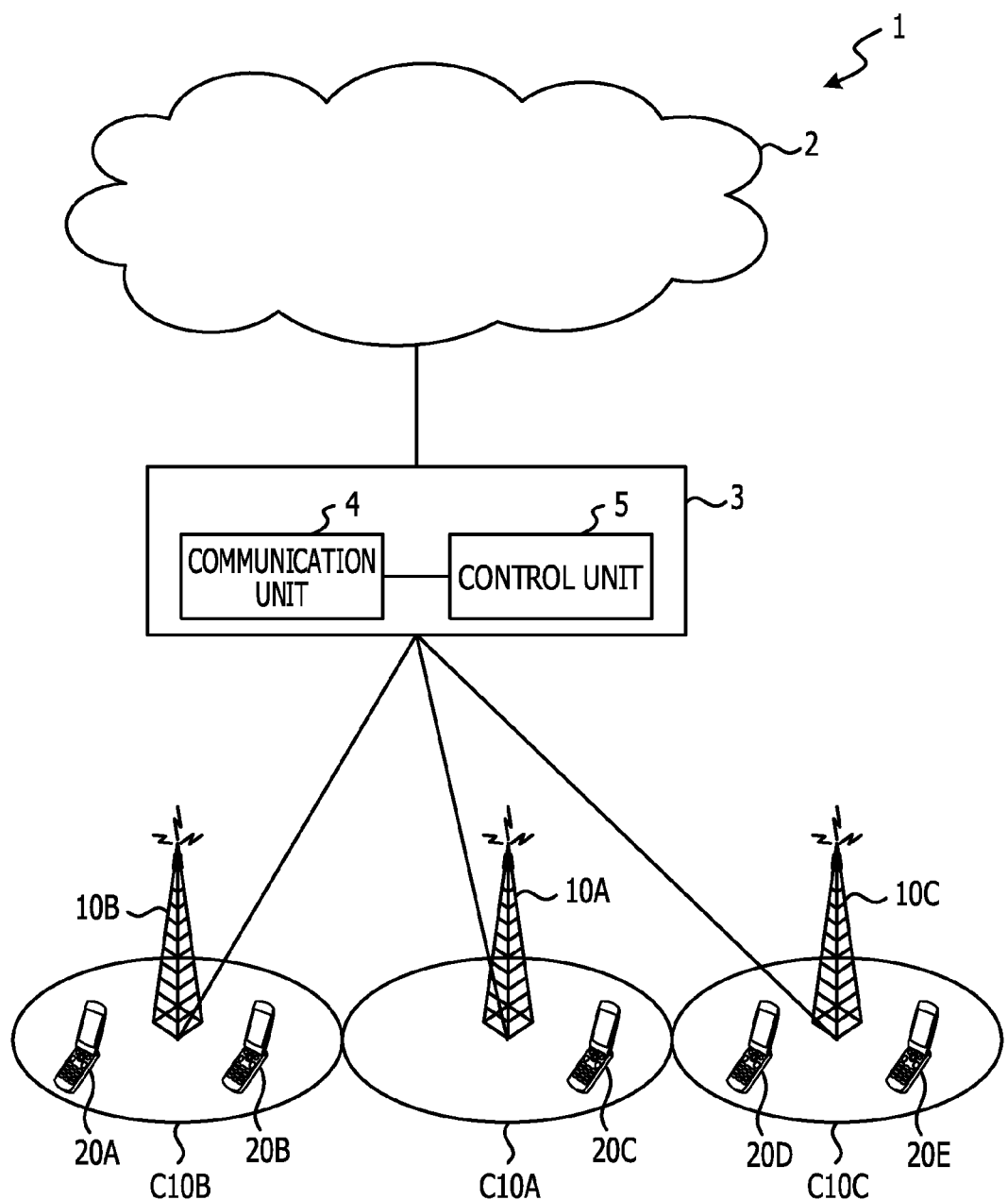
FIG. 1 is a diagram illustrating a configuration of a wireless communication system according to a first embodiment.

FIG. 1 illustrates the configuration of a wireless communication system 1 according to a first embodiment. As illustrated in FIG. 1, the wireless communication system 1 includes three base stations 10A to C and five wireless terminals 20A to E. The base stations 10A to C form cells C10A to C, respectively. The wireless terminals 20A and B exist in the cell C10B, the wireless terminal 20C exists in the cell C10A, and the wireless terminals 20D and E exists in the cell C10C.

The base stations 10A to C are connected to a network device 3 through wired connection, and the network device 3 is connected to a network 2 through wired connection. In addition, the base stations 10A to C are each provided so as to be able to transmit and receive pieces of data and pieces of control information, through the network device 3 and the network 2.

The network device 3 includes, for example, a communication unit 4 and a control unit 5, and these component parts are each unidirectionally or bi-directionally connected so as to be able to input and output signals and pieces of data. The network device 3 is realized using, for example, a gateway. As the hardware configuration of the network device 3, the communication unit 4 is realized using, for example, an interface circuit, and the control unit 5 is realized using, for example, a processor and a memory.

Figure 2:
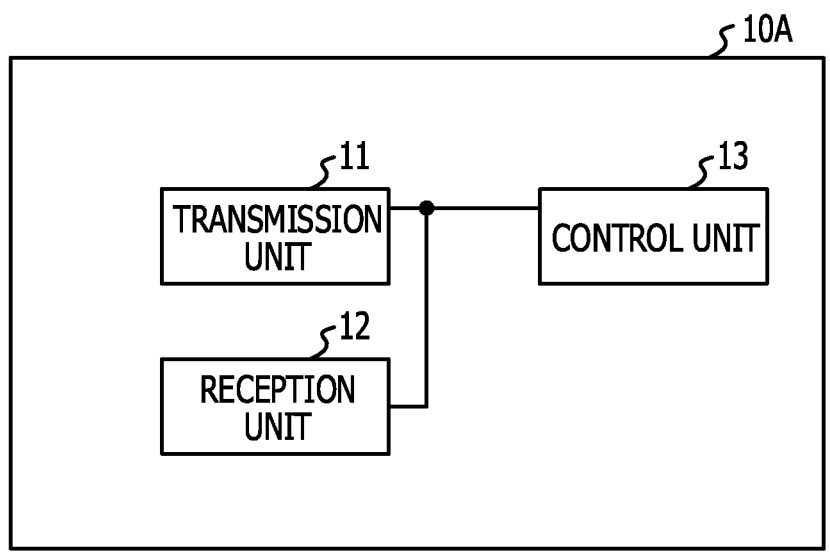
FIG. 2 is a functional block diagram illustrating a configuration of a base station according to the first embodiment.

FIG. 2 is a functional block diagram illustrating the configuration of the base station 10A. In addition, the functional configurations and hardware configurations of the base stations 10B and C are the same as those of the base station 10A. As illustrated in FIG. 2, the base station 10A includes a transmission unit 11, a reception unit 12, and a control unit 13. These component parts are each unidirectionally or bi-directionally connected so as to be able to input and output signals and pieces of data.

The transmission unit 11 transmits a data signal and a control signal through an antenna, using transmission power specified by the control unit 13. The transmission unit 11 transmits a downlink signal through, for example, a downlink data channel or control channel. A signal to be transmitted includes, for example, identification information of the base station 10A, information relating to reduction at the time of reducing the transmission power of the signal from the base station 10A, a reference signal used by each of the wireless terminals 20A to E for measuring the reception level of the signal from the base station 10A, and a handover parameter used by each of the wireless terminals 20A to E for determining whether or not to give notice of a handover request used for requesting execution of a handover procedure. The reference signal is transmitted while being periodically inserted in, for example, the time direction or frequency direction of a downlink channel. In addition, the insertion of the reference signal may be performed non-periodically.

Through an antenna, the reception unit 12 receives data signals and control signals transmitted from the wireless terminals 20A to E. The reception unit 12 receives an uplink signal through, for example, an uplink data channel or control channel. The received signal includes, for example, random access signals transmitted from the wireless terminals 20A to E. The random access signals are signals transmitted from wireless terminals by random access procedures. By receiving the random access signals and performing an exchange of information, the base stations 10A to C each recognize wireless terminals and manage information of wireless terminals (connected users) connected to the station itself. In addition, the antenna may be shared by transmission and reception.

Through the wired connection or wireless connection, the control unit 13 acquires pieces of data and pieces of control information from the network device 3 and the other base stations 10B and C. The control unit 13 outputs, to the transmission unit 11, data or control information to be transmitted. The control unit 13 inputs, from the reception unit 12, received data or control information.

The control unit 13 controls the transmission power of a signal to be transmitted from the base station 10A. At normal time, by normal transmission power control, the control unit 13 calculates predetermined transmission power P, based on control information or the like preliminarily given notice of or stored, and causes the signal to be transmitted with the predetermined transmission power P. The specified transmission power P is set so that the transmission signal of the base station 10A covers, for example, a specified area at the normal time. In addition, at the time of reducing transmission power, the control unit 13 causes the signal to be transmitted with transmission power reduced compared with the predetermined transmission power P. At the time of reducing transmission power, the signal is caused to be transmitted with, for example, transmission power obtained by reducing the predetermined transmission power P by an offset amount C. For example, in a case where there is no wireless terminal connected to the base station 10A or in a case where a state in which there is no wireless terminal connected to the base station 10A continues for a predetermined time period or more, the control unit 13 performs the reduction of transmission power in the base station 10A.

In addition, in a case where the base station 10A transmits a signal with transmission power obtained by reducing the specified transmission power P (the base station 10A is a transmission-power-reduced base station), the control unit 13 acquires reduction cancellation requests (offset cancellation request) transmitted from the wireless terminals 20A to E and used for cancelling the reduction of transmission power, cancels the reduction of transmission power, and restores the transmission power to the predetermined transmission power P. For example, the reduction cancellation requests given notice of by the wireless terminals 20A, B, D, and E connected to the base stations 10B and C neighboring the base station 10A are acquired through the base stations 10B and C forming cells in which the wireless terminals 20A, B, D, and E exist, the network device 3, and the network 2. In addition, the reduction cancellation request given notice of by, for example, the wireless terminal 20C connected to the base station 10A is acquired from the wireless terminal 20C through wireless transmission.

In addition, in a case where the other base stations 10B and C transmit signals with transmission power levels obtained by reducing the specified transmission power P (the other base stations 10B and C are transmission-power-reduced base stations), the control unit 13 acquires pieces of information (pieces of information relating to offsets) from the other base stations 10B and C. For example, the offset amount C is acquired. In addition, based on the acquired pieces of information relating to the reduction, the control unit 13 acquires pieces of information relating to reduction cancellation of transmission power levels (pieces of information relating to offset cancellation) in the other base stations 10B and C, and notifies the wireless terminal within the own cell (the cell C10A formed by the base station 10A) of the pieces of information relating to reduction cancellation of transmission power levels. As the information relating to offset cancellation, for example, an offset cancellation parameter used by the wireless terminal within the own cell for determining whether or not to notify the other base stations 10B and C of a reduction cancellation request is given notice of. In addition, the control unit 13 may notify the wireless terminal within the own cell of the pieces of information that are acquired from the other base stations 10B and C and relate to reduction, without change.

Figure 3:
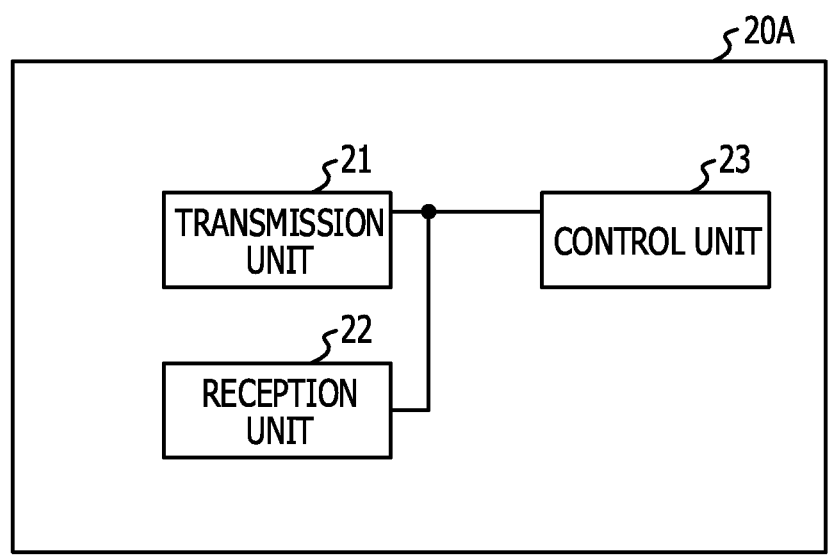
FIG. 3 is a functional block diagram illustrating a configuration of a wireless terminal according to the first embodiment.

FIG. 3 is a functional block diagram illustrating the configuration of the wireless terminal 20A. As illustrated in FIG. 3, the wireless terminal 20A includes a transmission unit 21, a reception unit 22, and a control unit 23. These component parts are each unidirectionally or bi-directionally connected so as to be able to input and output signals and pieces of data. In addition, the functional configurations and hardware configurations of the wireless terminals 20B to E are the same as the functional configuration and hardware configuration of the wireless terminal 20A.

The transmission unit 21 transmits a data signal and a control signal through an antenna. The transmission unit 21 transmits a uplink signal through, for example, an uplink data channel or control channel. The transmitted signal includes, for example, a random access signal, a reduction cancellation request, and a handover request. In a case where the wireless terminal 20A is connected to a specific base station or in a case where the wireless terminal 20A is handed over from a movement source base station to a movement destination base station, the wireless terminal 20A transmit the random access signal, and performs an exchange of information for call-connection with the base station, by a random access procedure.

Through the antenna, the reception unit 22 receives a data signal and a control signal transmitted from the base station. The received signal includes, for example, a reference signal, and information relating to reduction in a transmission-power-reduced base station. The reference signal is used for measuring, for example, a propagation state with a cell (own cell) in which the wireless terminal 20A exists or a cell (another cell) neighboring the own cell. In addition, the antenna may be shared by transmission and reception.

The control unit 23 outputs, to the transmission unit 21, data or control information to be transmitted. In addition, the control unit 23 inputs, from the reception unit 22, received data or control information.

The control unit 23 detects a reference signal from the base station forming the cell in which the wireless terminal 20A exists, and the control unit 23 measures a reception level (own-cell measurement). In addition, the control unit 23 detects a reference signal from a base station forming another cell, and measures a reception level (other-cell measurement). The reception level includes, for example, reception power or reception quality. As the reception level, for example, RSRP (Reference Signal Received Power), RSRQ (Reference Signal Received Quality) (=a reception power value/a total electric power value), SIR (Signal to Interference Ratio), SINR (Signal to Interference and Noise Ratio), and so forth are cited. The own-cell measurement and the other-cell measurement are periodically at predetermined intervals.

From the base station forming the cell in which the wireless terminal 20A exists, the control unit 23 acquires identification information of a transmission-power-reduced base station and information indicating the reduction of transmission power in the transmission-power-reduced base station.

In addition, in a case of detecting the signal of the transmission-power-reduced base station, the control unit 23 gives notice of a reduction cancellation request to the transmission-power-reduced base station, based on information relating to the reduction of the transmission power of the transmission-power-reduced base station and a reception level of the signal of the transmission-power-reduced base station, the reduction cancellation request being used for cancelling the reduction of transmission power.

In a case where when the wireless terminal 20A is connected to, for example, a base station neighboring the transmission-power-reduced base station, the signal of the transmission-power-reduced base station is detected based on the information acquired through the neighboring base station and used for identifying the transmission-power-reduced base station, the control unit 23 gives notice of the reduction cancellation request to the transmission-power-reduced base station, based on information, which is acquired through the neighboring base station and relates to the reduction of the transmission power of the transmission-power-reduced base station, and the reception power of the signal of the transmission-power-reduced base station.

Figure 4:
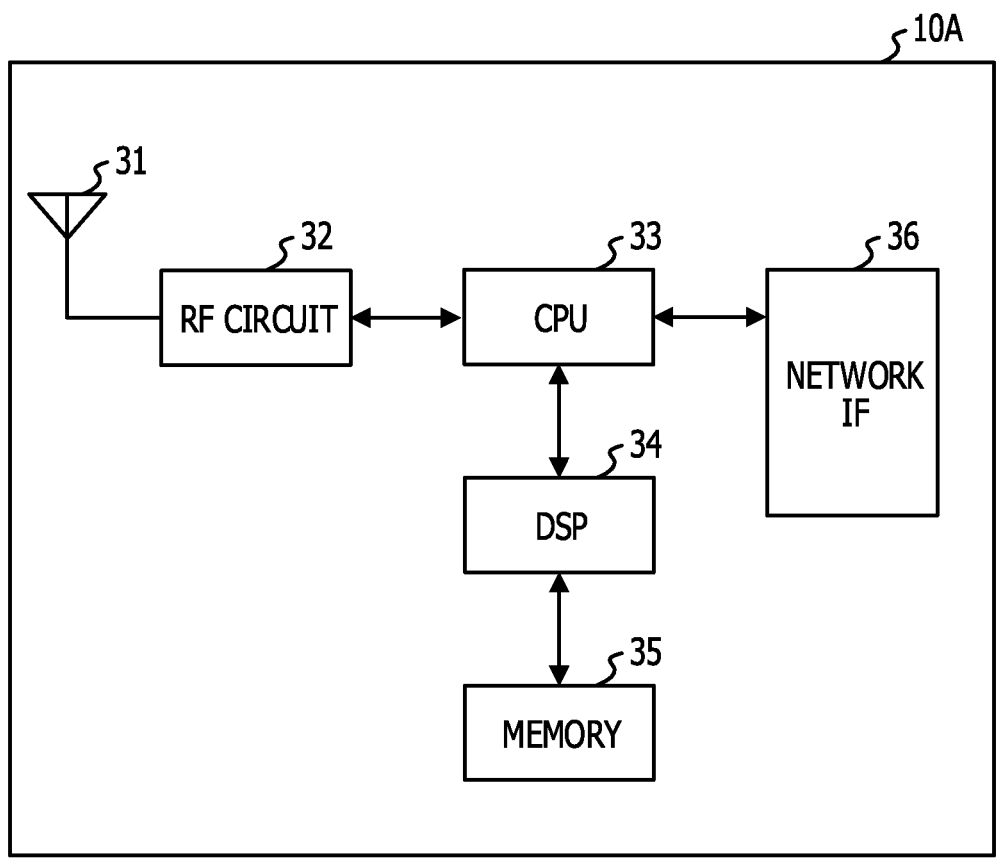
FIG. 4 is a diagram illustrating a hardware configuration of the base station according to the first embodiment.

FIG. 4 is a diagram illustrating the hardware configuration of the base station 10A. As illustrated in FIG. 4, as the configuration elements of hardware, the base station 10A includes, for example, an RF (Radio Frequency) circuit 32 equipped with an antenna 31, a CPU (Central Processing Unit) 33, a DSP (Digital Signal Processor) 34, a memory 35, and a network IF (Interface) 36. The CPU is connected so as to be able to input and output various kinds of signals and data through the network IF 36 such as a switch. The memory 35 includes at least one of, for example, a RAM (Random Access Memory) such as an SDRAM (Synchronous Dynamic Random Access Memory), a ROM (Read Only Memory), and a flash memory, and stores therein a program, control information, and data. The transmission unit 11 and the reception unit 12 are realized using, for example, the antenna 31 and the RF circuit 32. The control unit 13 is realized using, for example, an integrated circuit such as the CPU 33 or an integrated circuit such as the DSP 34.

Figure 5:
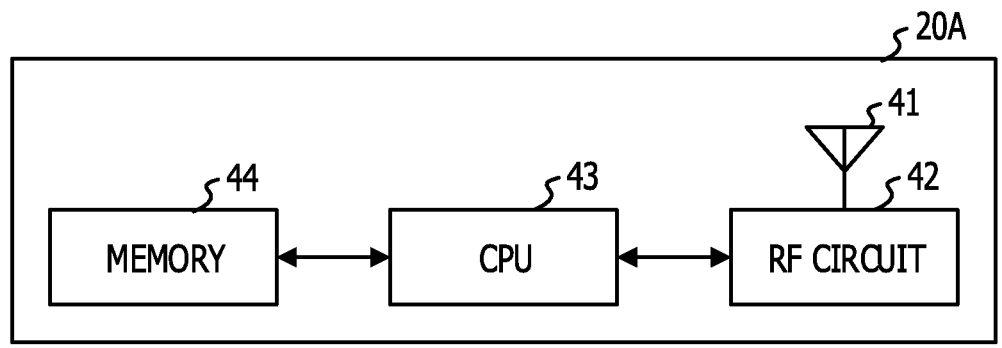
FIG. 5 is a diagram illustrating a hardware configuration of the wireless terminal according to the first embodiment.

FIG. 5 is a diagram illustrating the hardware configuration of the wireless terminal 20A. As illustrated in FIG. 5, as the configuration elements of hardware, the wireless terminal 20A include, for example, an RF circuit 42 equipped with an antenna 41, a CPU 43, and a memory 44. Furthermore, the wireless terminal 20A may include a display device connected to the CPU 43, such as an LCD (Liquid Crystal Display). The memory 44 includes at least one of, for example, a RAM such as an SDRAM, a ROM, and a flash memory, and stores therein a program, control information, and data. The transmission unit 21 and the reception unit 22 are realized using, for example, the antenna 41 and the RF circuit 42. The control unit 23 is realized using, for example, an integrated circuit such as the CPU 43.

The operation of the wireless communication system 1 in the first embodiment will be described. FIG. 6 is a sequence diagram for explaining the transmission power control operation of the base station 10A in the wireless communication system 1. In the following description, it is assumed that the base stations 10B and C are neighboring base stations. As the installation states of the plural base stations 10A to C, for example, a case of being relatively densely installed or a case where a base station (small cell) whose cell radius is relatively small is installed in a manner of being overlaid with a macro base station is conceivable. For example, using the small cell, throughput (cell capacity) per unit area is increased. In particular, in a case where the number of users is large, the small cell is effective in increasing the cell capacity.

First, it is assumed that the base station 10A is controlled so as to transmit a signal with the transmission power P at the normal time. In addition, the base stations 10A to C each periodically insert and transmit the reference signal in the time direction or frequency direction of a downlink channel. It is assumed that, at this time, the wireless terminal 20C that has existed in the cell C10A of the base station 10A moves and a state in which no wireless terminal currently connected to the base station 10A exists occurs.

Normally, even in a case where no currently connected wireless terminal exists, the base station 10A continues transmitting the reference signal with the transmission power P on an assumption that a wireless terminal in a neighboring cell is handed over and connected to the base station 10A.

Figure 7A:
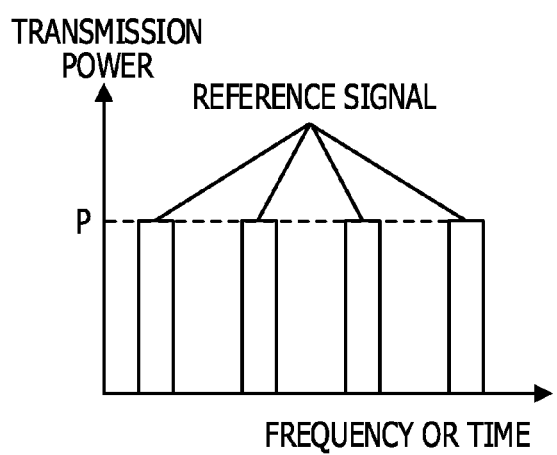
FIG. 7A includes a graph for explaining transmission power control of the base station according to the first embodiment.
Figure 7B:
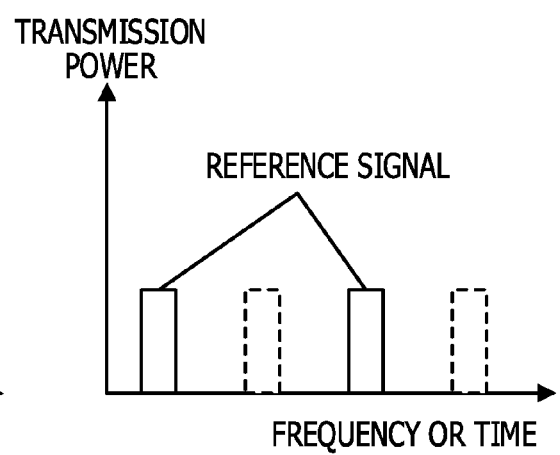
FIG. 7B includes a graph for explaining transmission power control of the base station according to the first embodiment.

In such a case, it is conceivable to reduce the transmission power of the base station 10A or to put the power supply thereof into OFF. From this, the power consumption of the entire system is reduced, and interference with the other cells is reduced. In FIG. 7A and FIG. 7B, the graphs of the transmission power levels of the base station 10A are exemplified. FIG. 7A illustrates transmission power at the normal time, and FIG. 7B illustrates transmission power at the time of reducing the transmission power. In each of FIGS. 7A and B, a horizontal axis indicates a frequency or time, and a vertical axis indicates transmission power. In addition, at the time of reducing the transmission power, the transmission power may be decreased or transmission intervals may be thinned out.

At this time, it is desirable to set a condition (timing for restoring to an original state) for determining whether or not to restore the reduced transmission power or the power supply put into OFF to the original state.

In a case where, for example, a user occurs within the coverage area of a cell in a state in which the transmission power is reduced, a method for restoring the transmission power to an original state is conceivable. However, in this method, the transmission power has been reduced. Therefore, as long as no user occurs within an area narrower than a coverage area at the normal time, it is difficult to restore the transmission power to the original state. In addition, in this method, in a case where the power supply is put into OFF, it is difficult to detect the occurrence of the user within the coverage area in a state of putting into OFF. Therefore, it is difficult to restore to the original state using this method.

In addition, for example, a method for restoring reduced transmission power or a power supply put into OFF to an original state in accordance with traffic amounts or statistical changes in the traffic amounts within an area covered by a plurality of base stations is conceivable. However, in this method, in a case where a connected user occurs within the area of the one base station 10A, it is difficult to immediately restore the reduced transmission power or the power supply put into OFF to the original state.

Therefore, in the first embodiment, the transmission power control operation of the base station 10A is performed as follows.

Figure 8:
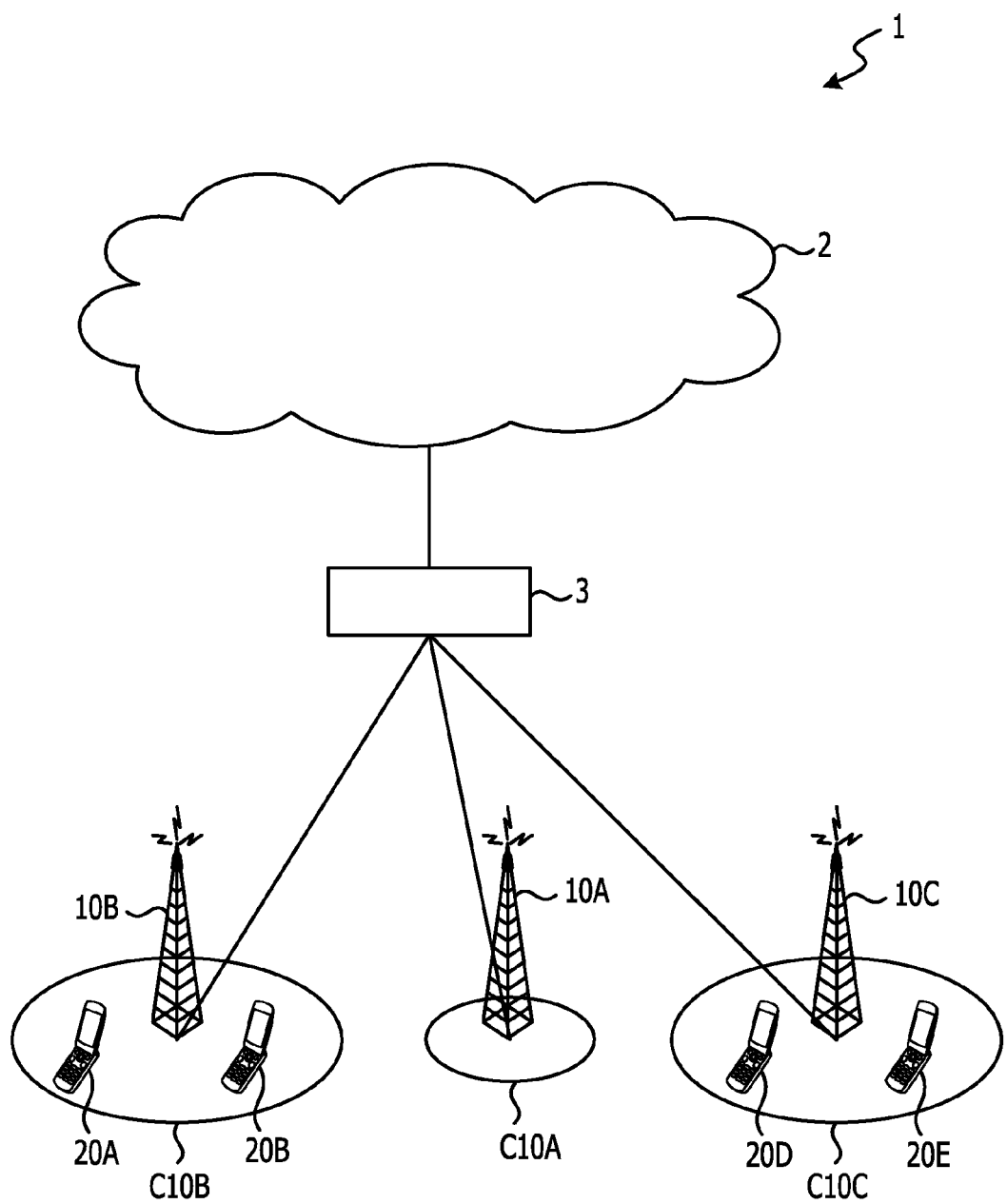
FIG. 8 is a diagram for explaining an operation of the wireless communication system according to the first embodiment.

As illustrated in FIG. 6, the base station 10A reduces transmission power used for transmitting a signal, compared with the predetermined transmission power P (S1). The base station 10A controls so as to reduce (offset reduction) transmission power by the offset amount C, compared with the specified transmission power P. The reduction of the transmission power is performed in accordance with, for example, the connection state of the base station 10A. In a case where, for example, a wireless terminal existing in the station itself (a wireless terminal currently connected to the station itself) becomes non-existent, the base station 10A performs the reduction of the transmission power. In addition, in a case where, for example, a state in which no wireless terminal currently connected to the station itself exists continues for a predetermined time period, the base station 10A performs the offset reduction. In FIG. 8, the state of the wireless communication system 1 at this time is exemplified. By reducing the transmission power, the cell radius (coverage area) of the cell C10A formed by the base station 10A becomes smaller. It is possible to perform the reduction of the transmission power, based on at least one of, for example, the number or states of wireless terminals currently connected to the base station 10A, the number or states of wireless terminals currently connected to the neighboring base stations, a propagation environment, and so forth. By performing the offset reduction on the transmission power of the reference signal of the base station 10A in this way, the power consumption of the entire system is reduced, and interference with the other cells is reduced.

The base station 10A notifies the neighboring base stations 10B and C of information relating to the reduction of the transmission power (information relating to an offset) (S2). The notification is performed through, for example, a wired network. As the information relating to an offset, for example, the ID (cell ID) and the offset amount C of the base station 10A are given notice of.

Each of the neighboring base stations 10B and C acquires information relating to reduction cancellation (information relating to offset cancellation), based on information relating to the offset of the base station 10A, given notice of (S3). The information relating to offset cancellation includes, for example, an offset cancellation parameter used for determining whether or not to request to cancel the offset.

The neighboring base station 10B notifies the currently connected wireless terminals 20A and B of the acquired information relating to reduction cancellation, and the neighboring base station 10C notifies the currently connected wireless terminals 20D and E of the acquired information relating to reduction cancellation (S4). The information given notice of includes, for example, the ID and the offset cancellation parameter of the base station 10A. The information relating to offset cancellation is wirelessly transmitted through, for example, an individual control channel or an individual data channel specified by the individual control channel.

Figure 9:
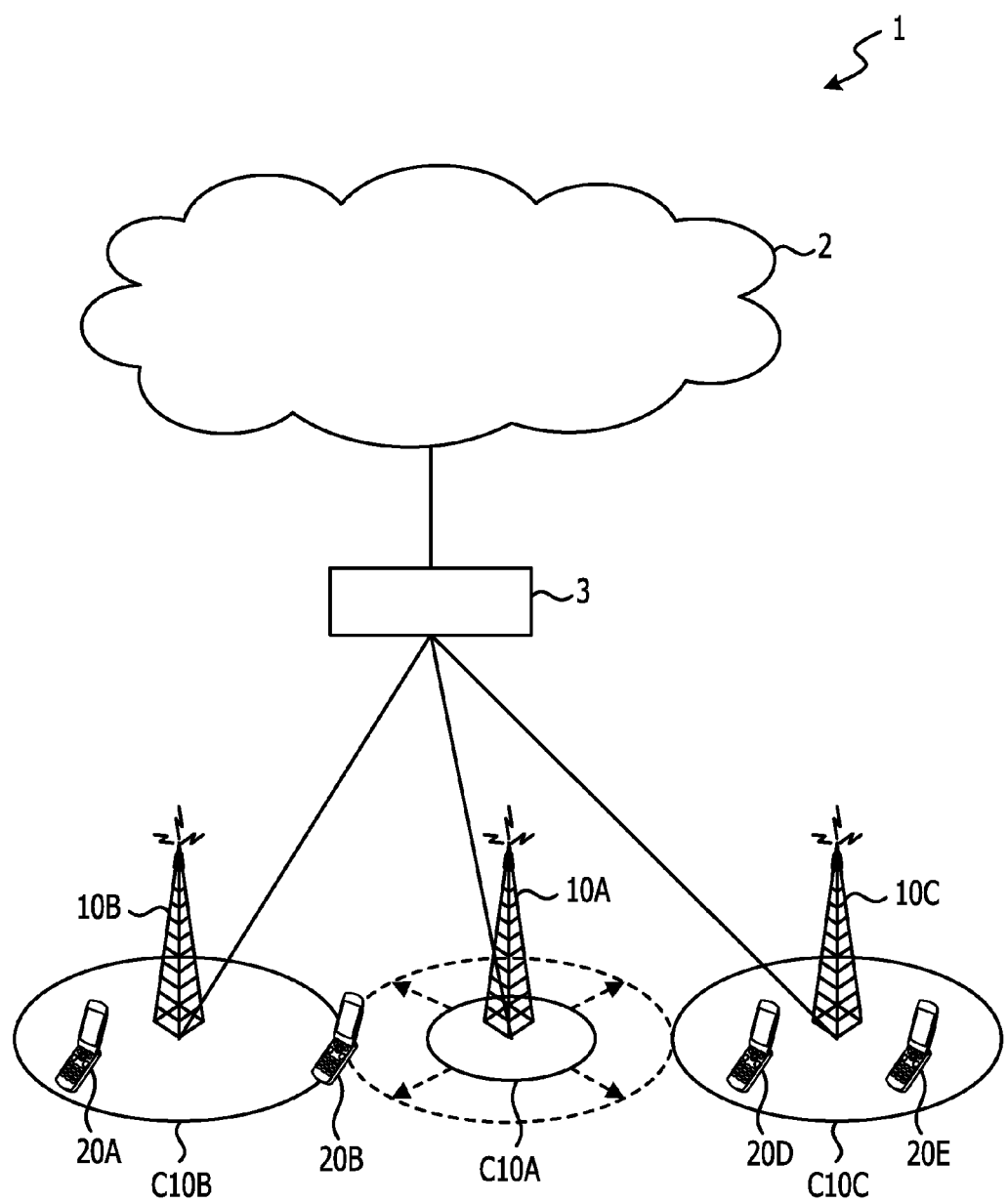
FIG. 9 is a diagram for explaining an operation of the wireless communication system according to the first embodiment.

In the wireless terminal 20B, a reduction cancellation request (offset cancellation request) occurs (S5). In FIG. 9, the state of the wireless communication system 1 at this time is exemplified. The wireless terminal 20B moves in, for example, a direction of approaching the base station 10A, and detects the reference signal of the base station 10A. In addition, using the reception power of the reference signal of the base station 10A, the reception power of the reference signal of the currently connected base station 10B, and the offset cancellation parameter, the wireless terminal 20B determines whether or not to request the base station 10A to cancel the offset. If, as a result of the determination, it is determined to request to cancel the offset, the offset cancellation request occurs in the wireless terminal 20B.

The wireless terminal 20B notifies the base station 10A of the reduction cancellation request (offset cancellation request) (S6). This notice is wirelessly transmitted to, for example, the currently connected base station 10B, and the base station 10B notifies the base station 10A of the notice through the wired network while the notice is routed through the network device 3 and the network 2.

The base station 10A cancels the reduction of the transmission power in response to the reduction cancellation request (offset cancellation request) (S7). The base station 10A cancels, for example, the offset reduction of the transmission power of the station itself, and controls so as to restore to the predetermined transmission power P. In addition, the reference signal is transmitted from the base station 10A using the predetermined transmission power P. Since, in this way, in response to the request from the wireless terminal 20B, the offset of the base station 10A is cancelled, the transmission power of the base station 10A is swiftly adjusted while reflecting the state of the wireless terminal 20B. In addition, in a case where, for example, the wireless terminal 20B requests handover, a handover procedure is executed at the time of the offset cancellation request or in response to the offset cancellation request, in a state where the offset is cancelled.

From the above, according to the first embodiment, in the wireless communication system 1, it is possible to swiftly adjust the transmission power of a base station and to effectively reduce the power consumption of the entire system.

From the above, according to the first embodiment, in the wireless communication system, it is possible to adequately perform the transmission power control of a base station and to effectively reduce the power consumption of the entire system.

In addition, while it is assumed that the wireless communication system 1 includes the three base stations 10A to C and the five wireless terminals 20A to 20E, the wireless communication system 1 is not limited to this, and the number of base stations and wireless terminals is arbitrary.

In addition, in the wireless communication system 1, in a case where the communication qualities of all the wireless terminals connected to the base station 10A are greater than or equal to a predetermined value or a case where a state in which the communication qualities of all the wireless terminals connected to the base station 10A are greater than or equal to the predetermined value continues for a predetermined time period or more, the control unit 13 may assume that a signal is transmitted in the base station 10A using transmission power obtained by reducing the specified transmission power P. In this case, in the wireless communication system 1, in a case where a communication quality becomes less than the predetermined value, the control unit 23 in a wireless terminal connected to the base station 10A may assume that a wireless terminal gives notice of the reduction cancellation request to the base station 10A. In this case, since, in response to the request from the wireless terminal, the offset of the base station 10A is cancelled, the transmission power of the base station 10A is swiftly adjusted while reflecting the state of the wireless terminal.

In addition, in the wireless communication system 1, in a case where the base station 10A transmits a signal with transmission power obtained by reducing the specified transmission power P, wireless terminals connected to, for example, the other base stations 10B and C are notified of the reduction cancellation parameter in place of the handover parameter, and the control unit 13 may cancel the reduction of transmission power in response to handover requests transmitted from the wireless terminals connected to the other base stations 10B and C and restore the transmission power to the predetermined transmission power P.

In addition, in the wireless communication system 1, in a case where a parameter relating to a wireless terminal satisfies a predetermined condition, it may be assumed that a reduction cancellation request given notice of by the relevant wireless terminal is discarded and the reduction of transmission power is not cancelled in a base station. Determination processing for discarding the reduction cancellation request may be performed in one of the neighboring base station, the network device, and the transmission-power-reduced base station. For example, in the wireless communication system 1, in a case where the movement velocity of a wireless terminal connected to the neighboring base station satisfies a predetermined condition, it may be assumed that a reduction cancellation request given notice of by the relevant wireless terminal is discarded and the reduction of transmission power is not cancelled in the base station. In this case, in a case where, as the predetermined condition, for example, the movement velocity of the wireless terminal connected to the neighboring base station is greater than or equal to a predetermined threshold value, it may be assumed that the reduction cancellation request given notice of by the relevant wireless terminal is discarded.

Second Embodiment

Figure 10:
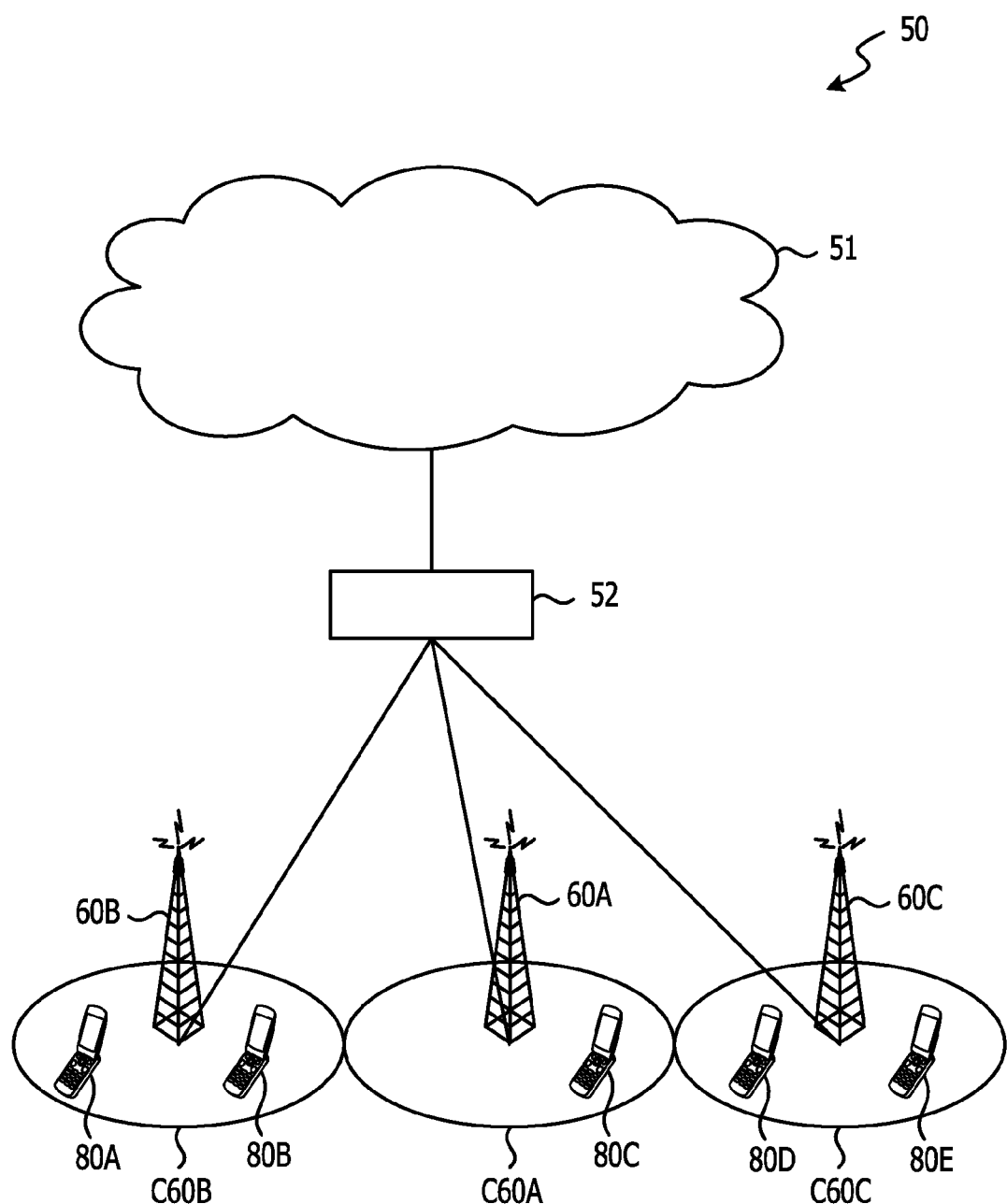
FIG. 10 is a diagram illustrating a configuration of a wireless communication system according to a second embodiment.

FIG. 10 illustrates the configuration of a wireless communication system 50 according to a second embodiment. In addition, the entire configuration of the wireless communication system 50 according to the second embodiment is the same as that of the wireless communication system 1 illustrated in FIG. 1.

As illustrated in FIG. 10, the wireless communication system 50 includes three base stations 60A to C and five wireless terminals 80A to E. The base stations 60A to C form cells C60A to C, respectively. In FIG. 10, the wireless terminals 80A and B exist in the cell C60B, the wireless terminal 80C exists in the cell C60A, and the wireless terminals 80D and E exists in the cell C60C.

The base stations 60A to C are connected to a network device 52 through wired connection, and the network device 52 is connected to a network 51 through wired connection. In addition, through the network device 52 and the network 51, the base stations 60A to C are each provided so as to be able to transmit and receive pieces of data and pieces of control information. The functional configuration and hardware configuration of the network device 52 are the same as those of the network device 3 of the first embodiment.

Figure 11:
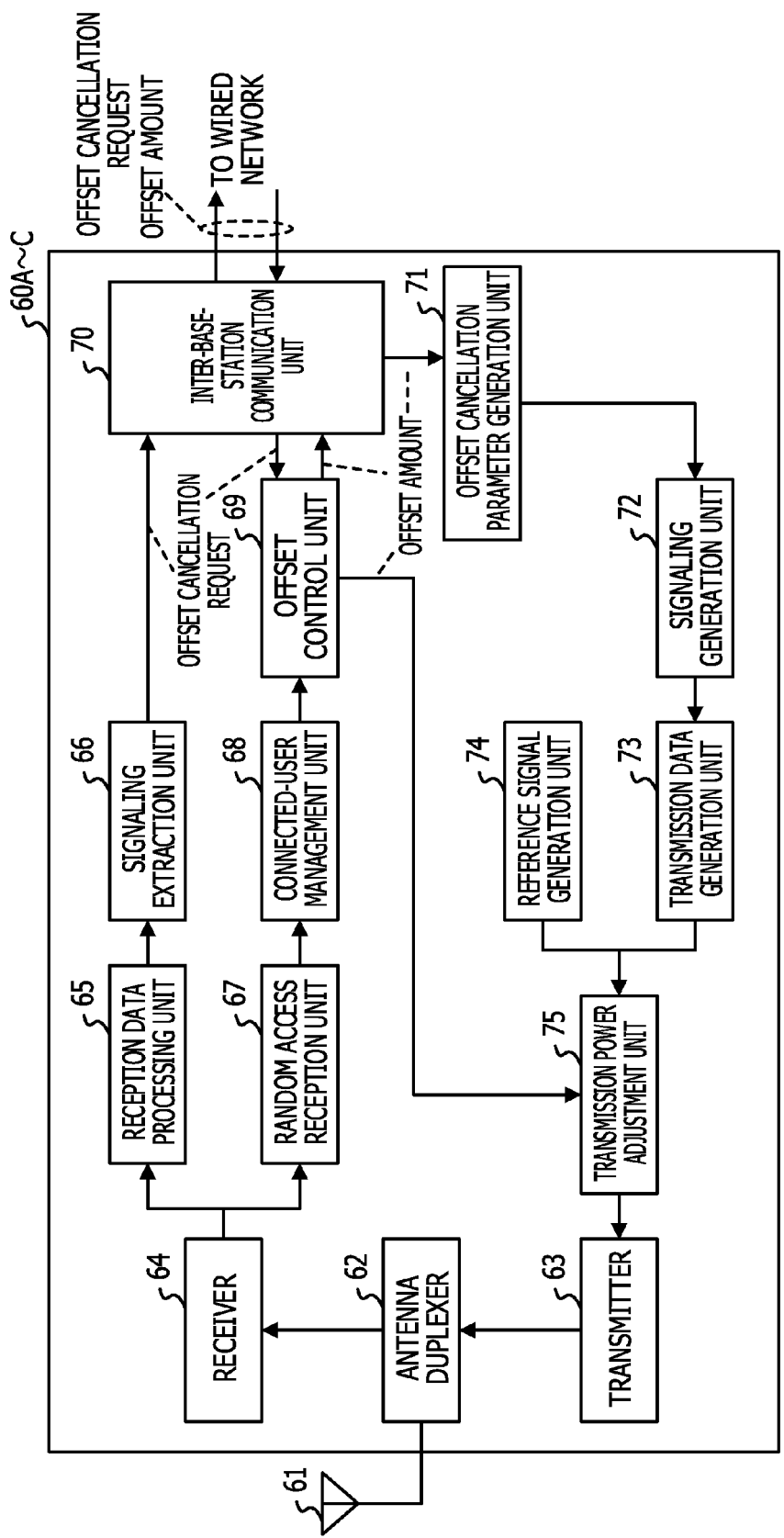
FIG. 11 is a functional block diagram illustrating a configuration of a base station in the wireless communication system according to the second embodiment.

FIG. 11 is a functional block diagram illustrating the configuration of the base station 60A. In addition, the functional configurations and hardware configurations of the base stations 60B and C are the same as the functional configuration and hardware configuration of the base station 60A. As illustrated in FIG. 11, the base stations 60A to C each include an antenna 61, an antenna duplexer 62, a transmitter 63, and a receiver 64. In addition, the base stations 60 each include a reception data processing unit 65, a signaling extraction unit 66, a random access reception unit 67, a connected-user management unit 68, and an offset control unit 69. In addition, the base stations 60 each include an inter-base-station communication unit 70, an offset cancellation parameter generation unit 71, a signaling generation unit 72, a transmission data generation unit 73, a reference signal generation unit 74, and a transmission power adjustment unit 75.

The antenna 61 is switched by the antenna duplexer 62 between transmission and reception. At the time of reception, the antenna 61 receives and outputs a wireless signal to the receiver 64. In addition, at the time of transmission, the antenna 61 transmits a wireless signal input from the transmitter 63. In addition, the base stations 60 may each include a plurality of antennas. In addition, the base stations 60 may each include respective antennas for transmission and reception.

The receiver 64 receives an uplink signal through, for example, an uplink data channel or control channel. The channel for receiving a signal includes, for example, a PRACH (Physical Random Access Channel), a PUSCH (Physical Uplink Shared Channel), and a PUCCH (Physical Uplink Control Channel). The uplink signal includes, for example, a random access signal, a reference signal, a control signal, and a data signal. The random access signal is a signal transmitted from a wireless terminal by a random access procedure. By receiving the random access signals and performing an exchange of information, the base stations 60A to C each recognize the wireless terminals 80 (users) and manage information of the wireless terminals 80 (connected users) connected to the station itself.

The receiver 64 performs, on a reception signal, wireless processing such as A/D (Analog to Digital) conversion and digital signal processing such as FFT processing. The receiver 64 outputs, to the reception data processing unit 65, the data signal, the control signal, and the reference signal, which are received. In addition, the receiver 64 outputs the received random access signal to the random access reception unit 67.

The reception data processing unit 65 performs demodulation processing and decoding processing on the data signal, the control signal, and the reference signal, which are received. Based on, for example, the control information preliminarily given notice of or stored and the reference signal for the demodulation processing, the reception data processing unit 65 performs the demodulation processing. In addition, the reception data processing unit 65 performs decoding processing for a signal subjected to the demodulation processing, based on the control information preliminarily given notice of or stored, and a channel estimation value estimated from the reference signal for channel estimation. The decoding processing is performed using, for example, the channel estimation value of PUSCH, estimated using the reference signal.

The signaling extraction unit 66 performs reordering processing and so forth for the signal subjected to the decoding processing, and acquires and outputs reception data. In addition, the signaling extraction unit 66 outputs a reception quality acquired from the reception signal, control information, and so forth.

The random access reception unit 67 receives the random access signal, and performs the random access procedure.

The connected-user management unit 68 manages information of a wireless terminal (connected user) currently connected to the station itself. For example, the identification information of the currently connected wireless terminal and information of allocation of a wireless resource for the currently connected wireless terminal are managed. The connected-user management unit 68 notifies the offset control unit 69 of the information of a connected user.

In a case where the connection state of the station itself satisfies a predetermined condition, the offset control unit 69 controls so as to reduce transmission power by a predetermined offset amount. In a case where, for example, a wireless terminal currently connected to the station itself becomes non-existent, the offset control unit 69 controls so as to perform offset reduction on the transmission power. In addition, in response to an offset cancellation request, the offset control unit 69 cancels the offset of the transmission power.

In accordance with an instruction (offset amount) from the offset control unit 69, the transmission power adjustment unit 75 adjusts transmission power used for transmitting a signal.

The inter-base-station communication unit 70 notifies a neighboring base station of the offset amount. The notification is performed through, for example, a wired network while being routed through the network device 52 and the network 51.

In addition, the inter-base-station communication unit 70 receives offset amounts from the other base stations 60A to C that perform offset reduction on transmission power levels, and notifies the offset cancellation parameter generation unit 71 of the offset amounts.

Based on the offset amounts, the offset cancellation parameter generation unit 71 generates offset cancellation parameters of which the wireless terminals 80A to E currently connected to the station itself are to be notified. For example, a handover parameter α, an offset cancellation parameter β, and an offset amount C are set so as to satisfy the condition of the following Expression (1).

$$\beta < \alpha - C \quad (1)$$

The signaling generation unit 72 stores user data and the control information in a predetermined signaling format. The user data is acquired from, for example, the network device 52 or the other base station 60B or C, and stored in a transmission buffer. The signaling generation unit 72 stores the offset cancellation parameter in, for example, a predetermined signaling format.

Based on the control information, the transmission data generation unit 73 performs encoding processing and modulation processing on the user data and the control information, stored in the predetermined signaling format, and generates transmission data.

The reference signal generation unit 74 generates the reference signal used for demodulation of data or channel estimation.

The transmitter 63 generates and outputs a transmission signal to the antenna 61. The transmitter 63 performs, for example, allocation of an antenna port and a wireless resource with respect to the transmission data or the reference signal. In addition, the transmitter 63 performs, for example, digital signal processing, and wireless processing such as D/A (Digital to Analog) conversion processing, and generates the transmission signal.

The transmitter 63 transmits a downlink signal through, for example, a downlink data channel or control channel. The channel for transmitting the signal includes, for example, a synchronization channel PSCH (Physical Synchronization Channel), an annunciation channel PBCH (Physical Broadcast Channel), a PDSCH (Physical Downlink Shared Channel), and PDCCH (Physical Downlink Control Channel). The downlink signal includes the reference signal, the control signal, and the data signal.

Figure 12:
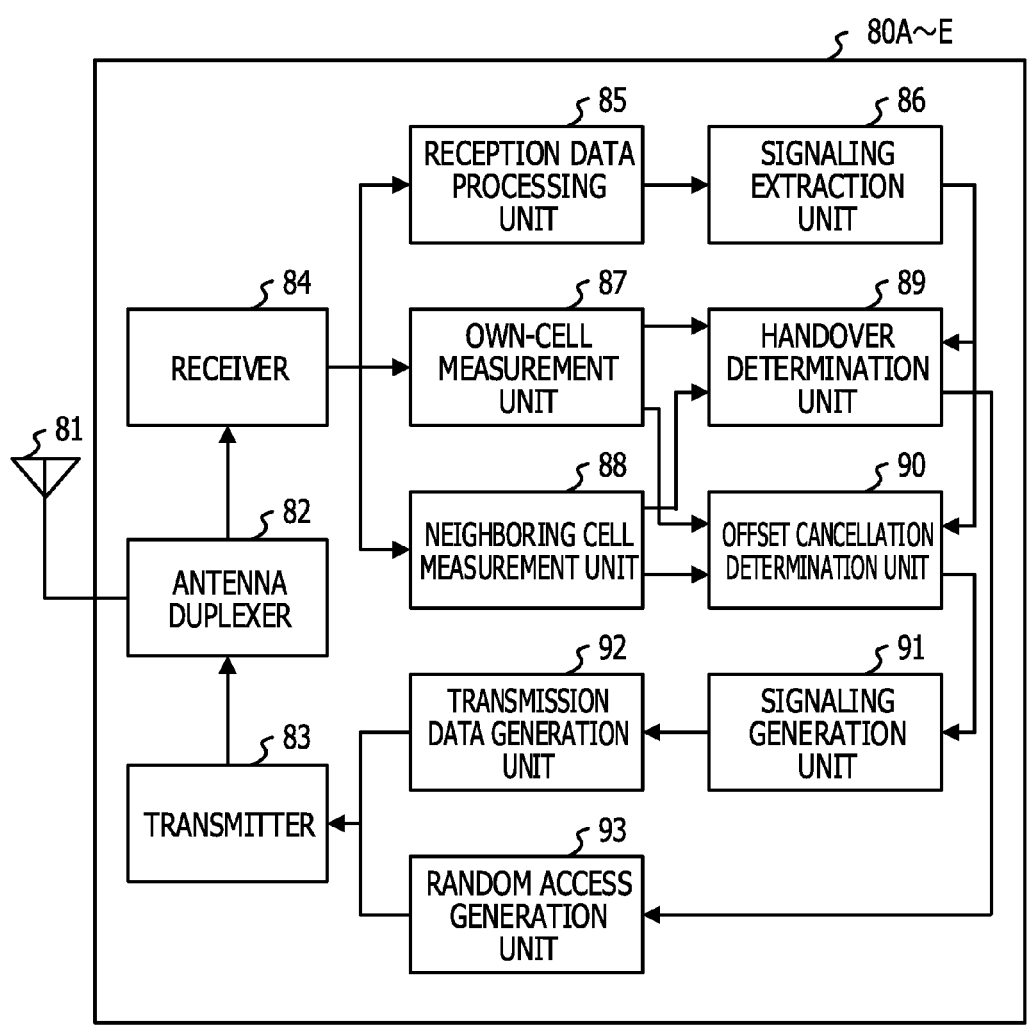
FIG. 12 is a functional block diagram illustrating a configuration of a wireless terminal in the wireless communication system according to the second embodiment.

FIG. 12 is a block diagram illustrating the functional configuration of the wireless terminal 80A. In addition, the functional configurations and hardware configurations of the wireless terminals 80B to E are the same as the functional configuration and hardware configuration of the wireless terminal 80A. As illustrated in FIG. 12, the wireless terminals 80 each include an antenna 81, an antenna duplexer 82, a transmitter 83, and a receiver 84. In addition, the wireless terminals 80 each include a reception data processing unit 85, a signaling extraction unit 86, an own-cell measurement unit 87, a neighboring cell measurement unit 88, a handover determination unit 89, and an offset cancellation determination unit 90. In addition, the wireless terminals 80 each include a signaling generation unit 91, a transmission data generation unit 92, and a random access generation unit 93.

The antenna 81 is switched by the antenna duplexer 82 between transmission and reception. At the time of reception, the antenna 81 receives and outputs a wireless signal to the receiver 84. In addition, at the time of transmission, the antenna 81 transmits a wireless signal input from the transmitter 83. In addition, the wireless terminals 80 may each include a plurality of antennas. In addition, the wireless terminals 80 may each include respective antennas for transmission and reception.

The receiver 84 receives a downlink signal through, for example, a downlink data channel or control channel. The reception signal includes, for example, the reference signal, the identification information of a base station, and the offset amount C in a transmission-power-reduced base station. The receiver 84 performs, on the reception signal, wireless processing such as A/D conversion and digital signal processing such as FFT processing.

The receiver 84 outputs, to the reception data processing unit 85, the data signal, the control signal, and the reference signal, which are received. In addition, based on the identification information of a base station to which the wireless terminal 80A is connected, the receiver 84 detects the reference signal received from the relevant base station, and outputs the relevant reference signal to the own-cell measurement unit 87. In addition, based on the identification information of a neighboring base station to which the wireless terminal 80A is connected, the receiver 84 detects the reference signal received from the relevant neighboring base station, and outputs the relevant reference signal to the neighboring cell measurement unit 88.

The reception data processing unit 85 performs demodulation processing and decoding processing on the data signal and the control signal, which are received. Based on, for example, the control information preliminarily given notice of or stored and the reference signal for the demodulation processing, the reception data processing unit 85 performs the demodulation processing. In addition, the reception data processing unit 85 performs decoding processing for a signal subjected to the demodulation processing, based on the control information preliminarily given notice of or stored, and a channel estimation value estimated from the reference signal for channel estimation.

The signaling extraction unit 86 performs reordering processing and so forth for the reception signal subjected to the decoding processing, and extracts data and control information. The extracted control information includes, for example, the identification information (for example, a cell ID or the like) of the base station or the neighboring base station, configuration information relating to the reference signal transmitted from the base station or the neighboring base station, the handover parameter, and the offset cancellation parameter. The signaling extraction unit 86 outputs the handover parameter to the handover determination unit 89. In addition, the signaling extraction unit 86 outputs the offset cancellation parameter to the offset cancellation determination unit 90.

The own-cell measurement unit 87 measures reception power, from the reference signal of the own cell (the reference signal transmitted from the base station 60B to which the wireless terminal 80A is connected).

The neighboring cell measurement unit 88 measures reception power, from the reference signal of another cell (the reference signal transmitted from a base station neighboring the base station 60B).

The handover determination unit 89 determines whether or not to give notice of the handover request for starting a handover procedure. The handover determination unit 89 determines whether or not the condition of, for example, the following Expression (2) is satisfied. In Expression (2), on the assumption that "the reception power of the reference signal of the other cell" is A [dB], "the reception power of the reference signal of the own cell" is B [dB], and "the handover parameter" is α [dB], $$A - B > \alpha \quad (2)$$

is defined. In a case of satisfying the condition of Expression (2), the handover procedure is started, and the handover request is given notice of.

The offset cancellation determination unit 90 determines whether or not to give notice of the offset cancellation request. The offset cancellation determination unit 90 determines whether or not the condition of, for example, the following Expression (3) is satisfied. In Expression (3), on the assumption that "the reception power of the reference signal of the other cell" is A [dB], "the reception power of the reference signal of the base station of the own cell" is B [dB], and "the offset cancellation parameter" is β [dB], $$A - B > \beta \quad (3)$$

is defined. In a case of satisfying the condition of Expression (3), the offset cancellation request is given notice of.

The signaling generation unit 91 generates packet data, from the user data and the control information, and performs processing for storing a generated packet in a transport block, or the like. The signaling generation unit 91 stores the offset cancellation request in a predetermined signaling format.

Based on the control information, the transmission data generation unit 92 performs encoding processing and modulation processing on the user data and the control information, stored in the predetermined signaling format, and generates transmission data.

The random access generation unit 93 generates the random access signal for the random access procedure. In a case where the wireless terminals 80A to E are connected to the base stations 60A to C or a case where one of the wireless terminals 80A to E is handed over from another of the base stations 60A to C to one of the base stations 60A to C, the wireless terminals 80A to E perform exchanges of pieces of information for call-connection with the base stations 60A to C using the random access procedure. The random access generation unit 93 generates, as the random access signal, a predetermined signal sequence from, for example, predetermined random access preamble configuration information.

The transmitter 83 generates and outputs a transmission signal to the antenna 81. The transmitter 83 performs, for example, allocation of an antenna port and a wireless resource with respect to the transmission data or the random access signal. In addition, the transmitter 83 performs, for example, digital signal processing, and wireless processing such as D/A conversion processing, and generates the transmission signal. The transmission signal includes, for example, the random access signal, the offset reduction cancellation request, and the handover request.

In addition, the hardware configuration of the base station 60A is the same as the hardware configuration of the base station 10A of the first embodiment. The antenna 61, the antenna duplexer 62, the wireless processing function of the transmitter 63, and the wireless processing function of the receiver 64 in the base station 60A are realized using, for example, an antenna and an RF circuit. In addition, the digital signal processing function of the transmitter 63, the digital signal processing function of the receiver 64, the reception data processing unit 65, the signaling extraction unit 66, the random access reception unit 67, the connected-user management unit 68, the offset control unit 69, the inter-base-station communication unit 70, the offset cancellation parameter generation unit 71, the signaling generation unit 72, the transmission data generation unit 73, the reference signal generation unit 74, and the transmission power adjustment unit 75 in the base station 60A are realized using, for example, an integrated circuit such as a CPU.

In addition, the hardware configuration of the wireless terminal 80A is the same as the hardware configuration of the wireless terminal 20A in the first embodiment. The antenna 81, the antenna duplexer 82, the wireless processing function of the transmitter 83, and the wireless processing function of the receiver 84 in the wireless terminal 80A are realized using, for example, an antenna and an RF circuit. The wireless processing function of the transmitter 83, the wireless processing function of the receiver 84, the reception data processing unit 85, the signaling extraction unit 86, the own-cell measurement unit 87, the neighboring cell measurement unit 88, the handover determination unit 89, the offset cancellation determination unit 90, the signaling generation unit 91, the transmission data generation unit 92, and the random access generation unit 93 in the wireless terminal 80A are realized using, for example, an integrated circuit such as a CPU.

Figure 13:
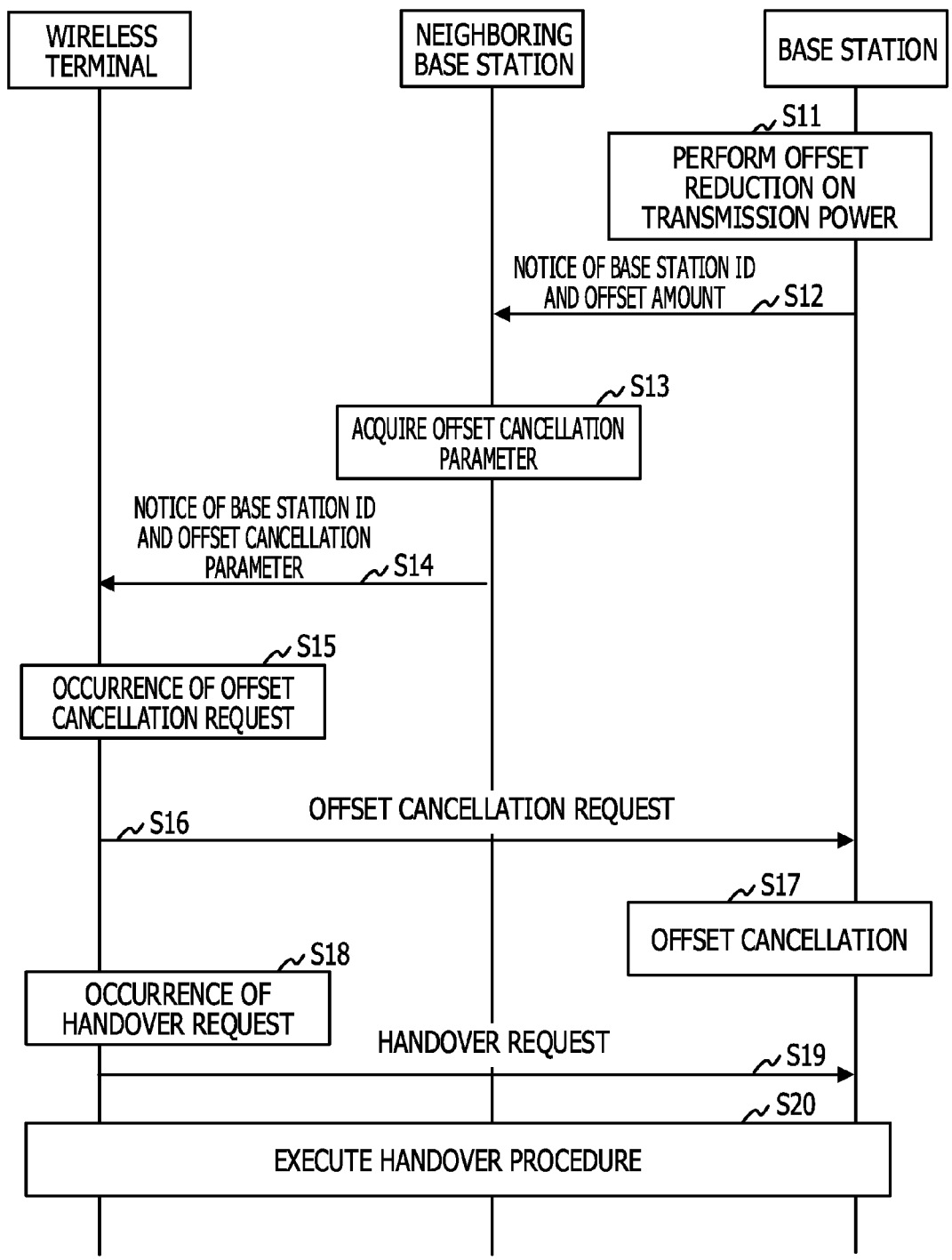
FIG. 13 is a sequence diagram for explaining an operation of the wireless communication system according to the second embodiment.

The operation of the wireless communication system 50 in the second embodiment will be described. FIG. 13 is a sequence diagram for explaining the transmission power control operation of the base station 60A in the wireless communication system 50. In the following description, it is assumed that the base stations 60B and C are neighboring base stations. First, it is assumed that the base stations 60A to C each periodically insert and transmit the reference signal in the time direction or frequency direction of a downlink channel. In addition, the insertion of the reference signal may be performed non-periodically. In addition, the base station 60A is controlled so as to transmit a signal with the transmission power P at normal time. It is assumed that, at this time, the wireless terminal 80C that has existed in the cell C60A of the base station 60A moves and a state in which no wireless terminal currently connected to the base station 60A exists occurs.

As illustrated in FIG. 13, the base station 60A reduces the transmission power P, used for transmitting a signal, by the offset amount C (offset reduction) while the absence of a currently connected wireless terminal serves as a trigger (S11). From this, the cell radius (coverage area) of the cell C60A formed by the base station 60A becomes smaller. By performing offset reduction on the transmission power of the reference signal of the base station 60A in this way, the power consumption of the entire system is reduced, and interference with the other cells is reduced.

The base station 60A notifies the neighboring base stations 60B and C of the ID (cell ID) and the offset amount C of the base station 60A (S12). The notification is performed through, for example, the wired network.

Based on the offset amount C of the base station 60A given notice of, the neighboring base stations 60B and C each acquire the offset cancellation parameter β (S13).

The neighboring base station 60B notifies the currently connected wireless terminals 80A and B of the ID of the base station 60A and the offset cancellation parameter β, and the neighboring base station 60C notifies the currently connected wireless terminals 80D and E of the ID of the base station 60A and the offset cancellation parameter β (S14). The notification is performed through wireless transmission.

In the wireless terminal 80B, the offset cancellation request occurs (S15). The wireless terminal 80B moves in, for example, a direction of approaching the base station 60A, and detects the reference signal of the base station 60A. In addition, using the reception power A of the reference signal of the base station 60A, the reception power B of the reference signal of the currently connected base station 60B, and the offset cancellation parameter β, the wireless terminal 80B determines whether or not to request the base station 60A to cancel the offset. This determination is performed based on whether or not the condition of the above-mentioned Expression (3) is satisfied. As a result of the determination, it is determined to request to cancel the offset, and the offset cancellation request occurs in the wireless terminal 80B. At this time, in such a manner as the above-mentioned Expression (1), the offset cancellation parameter β is set so as to become smaller than a difference between the handover parameter α and the offset amount C. Therefore, before the wireless terminal 80B (user) enters the coverage area C60A of the base station 60A at the normal time, the offset cancellation request to the base station 60A occurs.

The wireless terminal 80B notifies the base station 60A of the offset cancellation request (S16). This notice is wirelessly transmitted to, for example, the currently connected base station 60B, and the base station 60B notifies the base station 60A of the notice through the wired network while the notice is routed through the network device 52 and the network 51.

In response to the offset cancellation request, the base station 60A cancels the offset reduction of the transmission power of the station itself, and controls so as to restore to the transmission power P at the normal time (S17). In addition, the reference signal is transmitted from the base station 60A using the transmission power P. Since, in this way, in response to the request from the wireless terminal 80B, the offset of the base station 60A is cancelled, the transmission power of the base station 60A is swiftly controlled while reflecting the state of the wireless terminal 80B. Since, at this time, as described above, the offset cancellation request occurs, the offset of the base station 60A is cancelled before the wireless terminal 80B (user) enters the coverage area C60A of the base station 60A at the normal time.

The handover request occurs in the wireless terminal 80B (S18). For example, using the reception power A of the reference signal of the base station 60A after the offset cancellation, the reception power B of the reference signal of the currently connected base station 60B, and the handover parameter α, the wireless terminal 80B determines whether or not to request the base station 60A to execute handover. This determination is performed based on whether or not the condition of the above-mentioned Expression (2) is satisfied. As a result of the determination, it is determined to request to execute the handover, and the handover request occurs in the wireless terminal 80B. At this time, since, as described above, the base station 60A cancels the offset before the wireless terminal 80B enters the coverage area of the base station 60A at the normal time, the wireless terminal 80B is able to start the handover after the base station 60A cancels the offset and the transmission power becomes stable.

The wireless terminal 80B notifies the base station 60A of the handover request (S19). This notice is wirelessly transmitted to, for example, the currently connected base station 60B, and the base station 60B notifies the base station 60A of the notice through the wired network while the notice is routed through the network device 52 and the network 51.

In addition, a handover procedure is executed between the wireless terminal 80B, the base station 60B (movement source base station), and the base station 60A (movement destination base station), and the wireless terminal 80B is connected to the base station 60A (S20).

From the above, according to the second embodiment, in the wireless communication system 50, it is possible to swiftly adjust the transmission power of a base station and to effectively reduce the power consumption of the entire system.

In addition, while, in the second embodiment, it is assumed that the wireless communication system 50 includes the three base stations 60A to C and the five wireless terminals 80A to 80E, the wireless communication system 1 is not limited to this, and the number of base stations and wireless terminals is arbitrary.

In addition, in the second embodiment, it may be assumed that the offset cancellation parameter β is set so as to satisfy the following Expression (4) with respect to the handover parameter α and the offset amount C.

$$\beta > \alpha - C \qquad (4)$$

In a case of being set in this way, after the user (wireless terminal 80B) sufficiently enters the coverage area C60A of the transmission-power-reduced base station (base station 60A) at the normal time, the offset cancellation request occurs in the user, and the offset of the transmission power is cancelled in the transmission-power-reduced base station. From this, it is possible to avoid a ping-pong operation of restoring again to a transmission power reduction state immediately after the offset cancellation.

Third Embodiment

A wireless communication system according to a third embodiment will be described. The entire configuration of the wireless communication system according to the third embodiment is the same as the configuration of the wireless communication system 50 of the second embodiment.

A base station according to the third embodiment is different from the base station 60A of the second embodiment in operations according to the offset cancellation parameter generation unit 71, the signaling generation unit 72, and the offset control unit 69.

In the third embodiment, at the time of generating the offset cancellation parameter, the offset cancellation parameter generation unit sets so that the handover parameter α, the offset cancellation parameter β, and the offset amount C satisfy the following Expression (5).

$$\beta = \alpha - C \qquad (5)$$

In addition, the signaling generation unit stores the offset cancellation parameter in the signaling format of the handover parameter, and causes a wireless terminal connected to the relevant base station to be notified thereof, along with the identification information of a transmission-power-reduced base station. From this, the wireless terminal is notified of the offset cancellation parameter β in place of the handover parameter α, and the handover parameter α is updated in accordance with the offset amount C.

In addition, the offset control unit 69 cancels the offset in response to the handover request.

The other configuration of the base station according to the third embodiment is the same as the configuration of the base station 60A of the second embodiment. In addition, the hardware configuration of the base station according to the third embodiment is the same as the hardware configuration of the base station 60A of the second embodiment.

The wireless terminal according to the third embodiment is different from the wireless terminal 80A of the second embodiment in that the offset cancellation determination unit 90 is not included.

The other configuration of the wireless terminal according to the third embodiment is the same as the configuration of the wireless terminal 80A of the second embodiment. In addition, the hardware configuration of the wireless terminal according to the third embodiment is the same as the hardware configuration of the wireless terminal 80A of the second embodiment.

Figure 14:
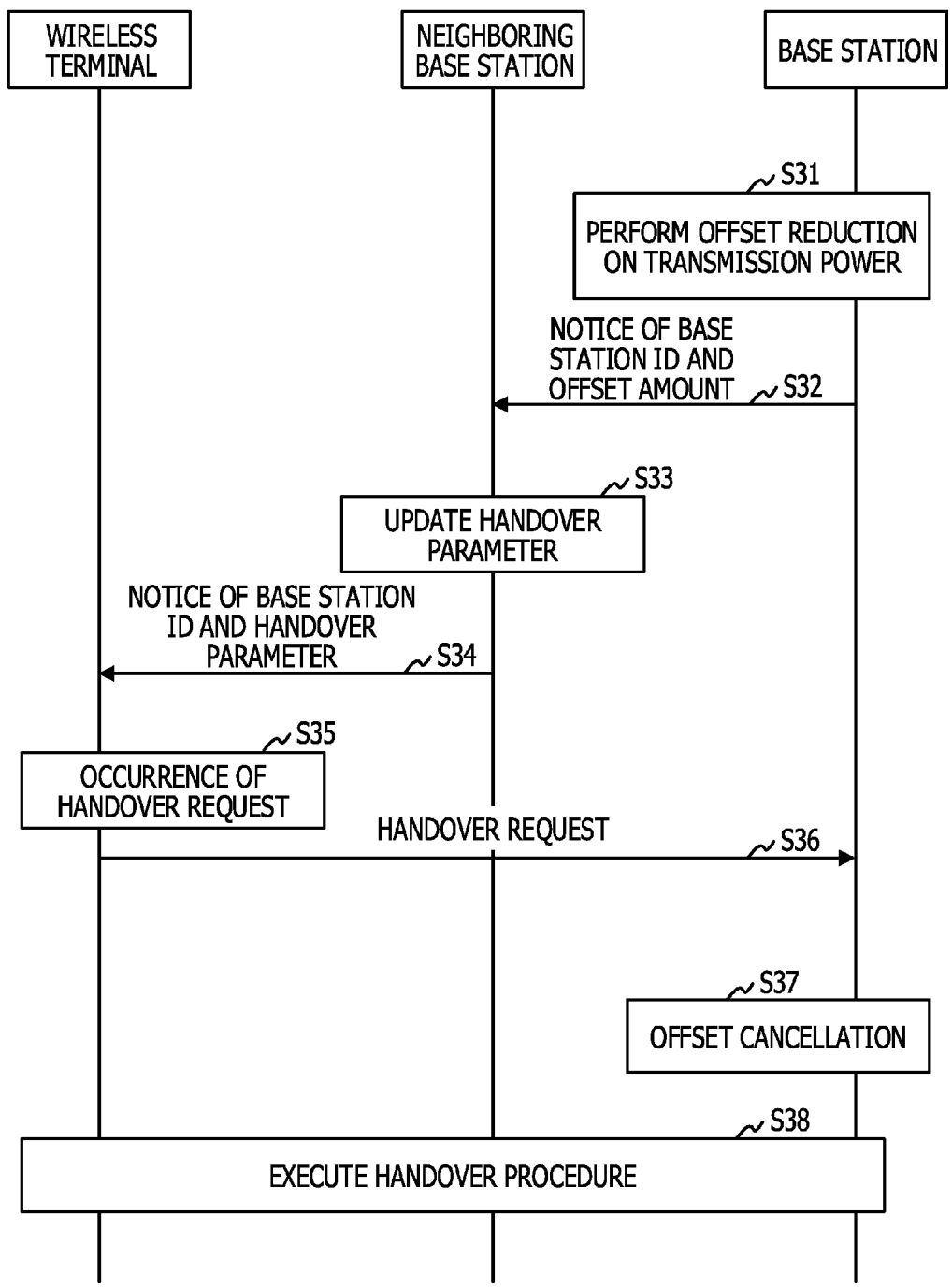
FIG. 14 is a sequence diagram for explaining an operation of a wireless communication system according to a third embodiment.

The operation of the wireless communication system in the third embodiment will be described. FIG. 14 is a sequence diagram for explaining the transmission power control operation of the base station, in the wireless communication system in the third embodiment. In the following description, it is assumed that the base station is controlled so as to transmit a signal with the transmission power P at the normal time. In addition, the base station and a base station neighboring the relevant base station each periodically insert and transmit the reference signal in the time direction or frequency direction of a downlink channel. In addition, the insertion of the reference signal may be performed non-periodically. It is assumed that, at this time, the wireless terminal that has existed in the cell (a coverage area at the normal time) of the base station moves and a state in which no wireless terminal currently connected to the base station exists occurs.

As illustrated in FIG. 14, the base station reduces the transmission power P, used for transmitting a signal, by the offset amount C (offset reduction) while the absence of a currently connected wireless terminal serves as a trigger (S31). From this, the size (coverage area) of the cell formed by the base station (transmission-power-reduced base station) becomes smaller. By performing offset reduction on the transmission power of the reference signal of the base station in this way, the power consumption of the entire system is reduced, and interference with the other cells is reduced.

The base station notifies the neighboring base station of a base station ID (cell ID) and the offset amount C (S32). The notification is performed through, for example, a wired network.

Based on the offset amount C given notice of, the neighboring base station acquires the offset cancellation parameter β (S33). The offset cancellation parameter β is set so as to satisfy, for example, the above-mentioned Expression (5).

The neighboring base station notifies the currently connected wireless terminal of the base station ID and the updated handover parameter α(=the offset cancellation parameter β) (S34). The notification is performed through wireless transmission.

In the wireless terminal, the handover request occurs (S35). The wireless terminal moves in, for example, a direction of approaching the base station, and detects the reference signal of the base station. In addition, using the reception power A of the reference signal of the base station (the above-mentioned transmission-power-reduced base station), the reception power B of the reference signal of the currently connected base station (the above-mentioned neighboring base station), and the updated handover parameter α(=the offset cancellation parameter β), the wireless terminal determines whether or not to request the base station to execute handover. This determination is performed based on whether or not the condition of the above-mentioned Expression (2) is satisfied. As a result of the determination, it is determined to request to execute the handover, and the handover request occurs in the wireless terminal.

The wireless terminal notifies the base station of the handover request (S36). This notice is wirelessly transmitted to, for example, the currently connected base station (the above-mentioned neighboring base station), and the neighboring base station notifies the base station of the notice through the wired network while the notice is routed through the network device and the network.

In response to the handover request, the base station cancels the offset of the transmission power (S37). The base station controls so as to restore to the transmission power to the transmission power P at the normal time, and the reference signal is transmitted using the transmission power P. Since, in this way, in response to the request from the wireless terminal, the offset of the base station is cancelled, the transmission power of the base station is swiftly controlled while reflecting the state of the wireless terminal. In addition, in the third embodiment, the wireless terminal is notified of the offset cancellation parameter in place of the handover parameter, and the offset is cancelled in response to the handover request from the wireless terminal. Therefore, it is possible to execute the cancellation of the offset without adding signaling of the offset cancellation parameter.

In addition, a handover procedure is executed between the wireless terminal, the above-mentioned neighboring base station (movement source base station), and the above-mentioned base station (movement destination base station), and the wireless terminal is connected to the base station (S38).

From the above, according to the third embodiment, in the wireless communication system, it is possible to swiftly adjust the transmission power of a base station and to effectively reduce the power consumption of the entire system.

Fourth Embodiment

A wireless communication system according to a fourth embodiment will be described. The entire configuration of the wireless communication system according to the fourth embodiment is the same as the configuration of the wireless communication system 50 of the second embodiment.

Figure 15:
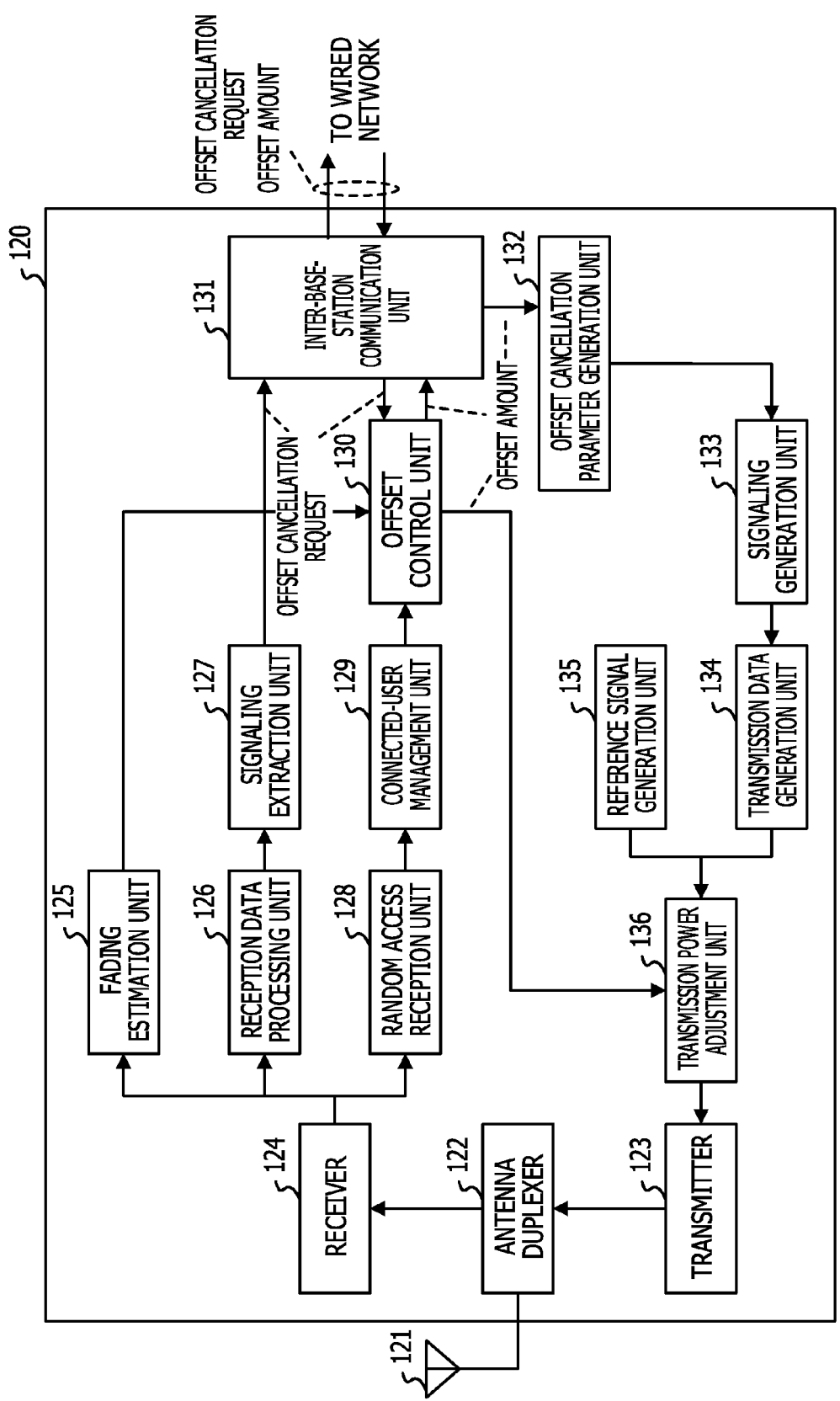
FIG. 15 is a functional block diagram illustrating a configuration of a base station in a wireless communication system according to a fourth embodiment.

FIG. 15 is a block diagram illustrating the functional configuration of a base station 120 in the wireless communication system according to the fourth embodiment. As illustrated in FIG. 15, the base station 120 includes an antenna 121, an antenna duplexer 122, a transmitter 123, and a receiver 124. In addition, the base station 120 includes a reception data processing unit 126, a signaling extraction unit 127, a random access reception unit 128, a connected-user management unit 129, and an offset control unit 130. In addition, the base station 120 includes an inter-base-station communication unit 131, an offset cancellation parameter generation unit 132, a signaling generation unit 133, a transmission data generation unit 134, a reference signal generation unit 135, and a transmission power adjustment unit 136.

The base station 120 according to the fourth embodiment is different from the base station 60A according to the second embodiment in that the fading estimation unit 125 is included. In addition, in the base station 120, operations relating to the receiver 124 and the offset control unit 130 are different from the operations relating to the receiver 61 and the offset control unit 70 in the base station 60A.

The receiver 121 outputs a reception signal to the fading estimation unit 125.

Based on the reception signal, the fading estimation unit 125 estimates the fading frequency of a wireless terminal. Since the fading frequency relates to the movement velocity of the wireless terminal, the base station 120 is able to estimate the movement velocity of the wireless terminal. Information of the movement velocity estimated in the fading estimation unit 125 is output to the offset control unit 130.

In a case where the movement velocity is a greater than or equal to a threshold value at the time of receiving the offset cancellation request from the wireless terminal, the offset control unit 130 discards the offset cancellation request from the wireless terminal, and does not perform offset cancellation.

The antenna 121, the antenna duplexer 122, the transmitter 123, the reception data processing unit 126, the signaling extraction unit 127, the random access reception unit 128, the connected-user management unit 129, the inter-base-station communication unit 131, the offset cancellation parameter generation unit 132, the signaling generation unit 133, the transmission data generation unit 134, the reference signal generation unit 135, and the transmission power adjustment unit 136, which serve as the other configurations of the base station 120, are the same as the antenna 61, the antenna duplexer 62, the transmitter 63, the reception data processing unit 65, the signaling extraction unit 66, the random access reception unit 67, the connected-user management unit 68, the inter-base-station communication unit 70, the offset cancellation parameter generation unit 71, the signaling generation unit 72, the transmission data generation unit 73, the reference signal generation unit 74, and the transmission power adjustment unit 75, respectively, in the base station 60A.

In addition, the hardware configuration of the base station 120 is the same as the hardware configuration of the base station 60A of the second embodiment. The antenna 121, the antenna duplexer 122, the wireless processing function of the transmitter 123, and the wireless processing function of the receiver 124 in the base station 120 are realized using, for example, an antenna and an RF circuit. In addition, the digital signal processing function of the transmitter 123, the digital signal processing function of the receiver 124, the fading estimation unit 125, the reception data processing unit 126, the signaling extraction unit 127, the random access reception unit 128, the connected-user management unit 129, the offset control unit 130, the inter-base-station communication unit 131, the offset cancellation parameter generation unit 132, the signaling generation unit 133, the transmission data generation unit 134, the reference signal generation unit 135, and the transmission power adjustment unit 136 in the base station 120A are realized using, for example, an integrated circuit such as a CPU.

The functional configuration of the wireless terminal according to the fourth embodiment is the same as the functional configuration of the wireless terminal 80A of the second embodiment. In addition, the hardware configuration of the wireless terminal according to the third embodiment is the same as the hardware configuration of the wireless terminal 80A of the second embodiment.

Figure 16:
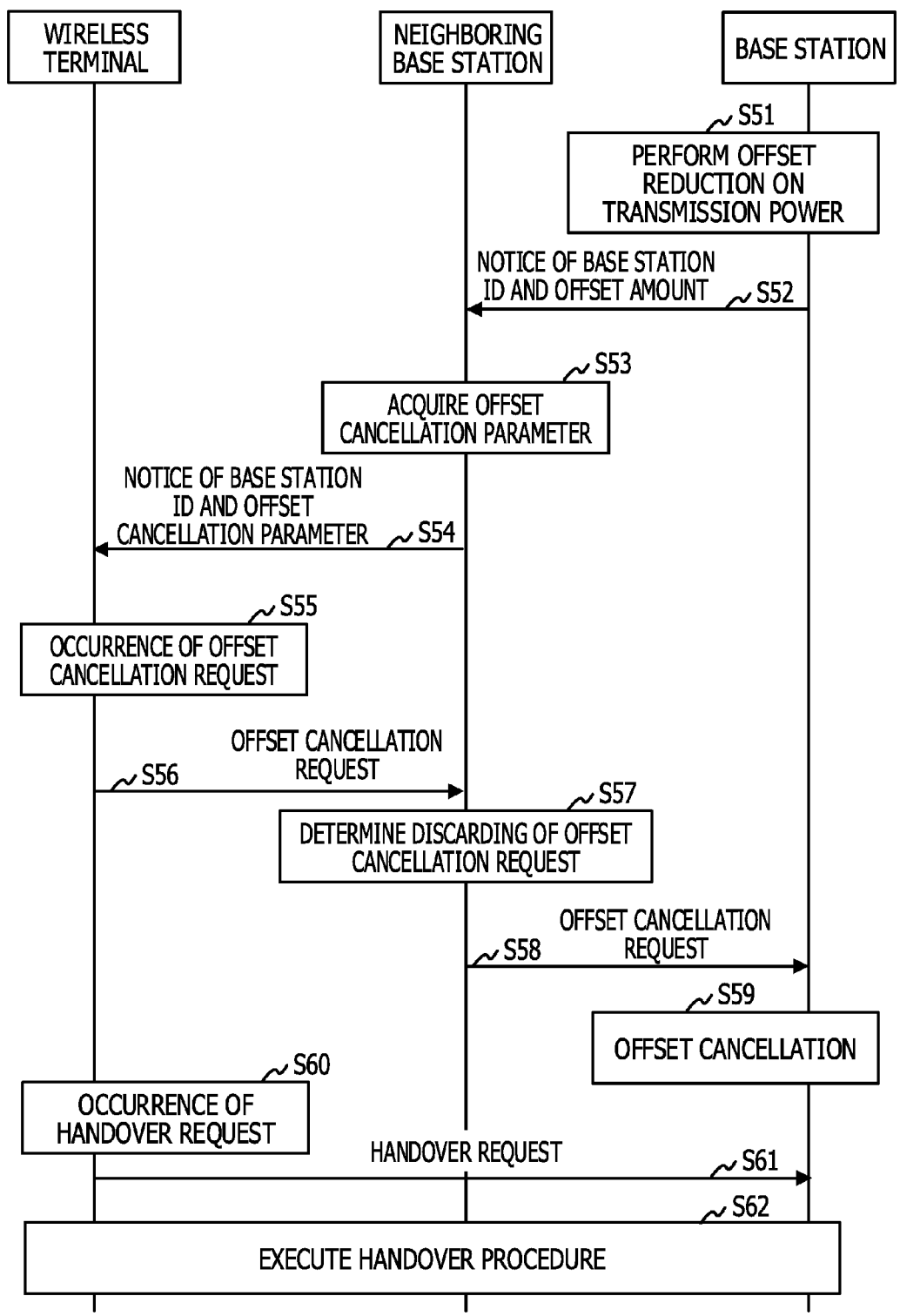
FIG. 16 is a sequence diagram for explaining an operation of the wireless communication system according to the fourth embodiment.

The operation of the wireless communication system in the fourth embodiment will be described. FIG. 16 is a sequence diagram for explaining the transmission power control operation of one base station (transmission-power-reduced base station) out of the base stations 120, in the wireless communication system in the fourth embodiment. In the following description, it is assumed that the base station is controlled so as to transmit a signal with the transmission power P at the normal time. The base station and a base station neighboring the relevant base station each periodically insert and transmit the reference signal in the time direction or frequency direction of a downlink channel. In addition, the insertion of the reference signal may be performed non-periodically. In addition, it is assumed that, at this time, the wireless terminal that has existed in the cell (a coverage area at the normal time) of the base station moves and a state in which no wireless terminal currently connected to the base station exists occurs.

As illustrated in FIG. 16, the base station reduces the transmission power P, used for transmitting a signal, by the offset amount C (offset reduction) while the absence of a currently connected wireless terminal serves as a trigger (S51). From this, the size (coverage area) of the cell formed by the base station (transmission-power-reduced base station) becomes smaller. By performing offset reduction on the transmission power of the reference signal of the base station in this way, the power consumption of the entire system is reduced, and interference with the other cells is reduced.

The base station notifies the neighboring base station of a base station ID (cell ID) and the offset amount C (S52). The notification is performed through, for example, a wired network.

Based on the offset amount C given notice of, the neighboring base station acquires the offset cancellation parameter β (S53). The offset cancellation parameter β is set so as to satisfy, for example, the above-mentioned Expression (1).

The neighboring base station notifies the currently connected wireless terminal of the base station ID and the offset cancellation parameter β (S54). The notification is performed through wireless transmission.

In the wireless terminal, the offset cancellation request occurs (S55). The wireless terminal moves in, for example, a direction of approaching the base station, and detects the reference signal of the base station. In addition, using the reception power A of the reference signal of the base station (the above-mentioned transmission-power-reduced base station), the reception power B of the reference signal of the currently connected base station (the above-mentioned neighboring base station), and the offset cancellation parameter β, the wireless terminal determines whether or not to request the base station to cancel the offset. This determination is performed based on whether or not the condition of, for example, the above-mentioned Expression (2) is satisfied. As a result of the determination, it is determined to request to cancel the offset, and the offset cancellation request occurs in the wireless terminal. At this time, in such a manner as the above-mentioned Expression (1), the offset cancellation parameter β is set so as to become smaller than a difference between the handover parameter α and the offset amount C. Therefore, before the wireless terminal (user) enters the coverage area of the base station at the normal time, the offset cancellation request to the base station occurs.

The wireless terminal notifies the currently connected base station (the above-mentioned neighboring base station) of the offset cancellation request (S56). The notification is performed through wireless transmission.

In accordance with the movement velocity of the currently connected wireless terminal, the neighboring base station determines whether or not to discard the offset cancellation request (S57). The neighboring base station estimates the fading frequency from, for example, the reception signal of the currently connected wireless terminal, and acquires the movement velocity of the currently connected wireless terminal, based on the estimated fading frequency. In a case where the movement velocity is greater than or equal to, for example, a predetermined threshold value, the neighboring base station discards the offset cancellation request from the wireless terminal. From this, the base station (the above-mentioned transmission-power-reduced base station) is not notified of the offset cancellation request, and the offset cancellation is not performed. There is a high possibility that a wireless terminal whose movement velocity is relatively large quickly moves out of the cell even if the offset is cancelled. Therefore, by discarding the offset cancellation request from a wireless terminal whose movement velocity is greater than or equal to the predetermined threshold value, it is possible to avoid a state in which ON/OFF of the offset is frequently performed in particular in a base station whose cell radius is relatively small. In a case where the offset cancellation request is discarded in S57, the processing is terminated without change.

In a case where the offset cancellation request is not discarded in S57, the neighboring base station notifies the base station of the offset cancellation request (S58). The base station is notified of this notice through the wired network while the notice is routed through the network device and the network.

In response to the offset cancellation request, the base station cancels the offset reduction of the transmission power of the station itself (S59). In addition, the reference signal is transmitted from the base station using the transmission power P. Since, in this way, in response to the request from the wireless terminal, the offset of the base station is cancelled, the transmission power of the base station is swiftly controlled while reflecting the state of the wireless terminal.

The handover request occurs in the wireless terminal (S60). For example, using the reception power A of the reference signal of the base station after the offset cancellation, the reception power B of the reference signal of the currently connected base station, and the handover parameter α, the wireless terminal determines whether or not to request the base station to execute handover. This determination is performed based on whether or not the condition of the above-mentioned Expression (2) is satisfied. As a result of the determination, it is determined to request to execute the handover, and the handover request occurs in the wireless terminal.

The wireless terminal notifies the base station of the handover request (S61). This notice is wirelessly transmitted to, for example, the currently connected base station, and the currently connected base station notifies the base station of the notice through the wired network while the notice is routed through the network device and the network.

In addition, a handover procedure is executed between the wireless terminal, the above-mentioned neighboring base station (movement source base station), and the above-mentioned transmission-power-reduced base station (movement destination base station), and the wireless terminal is connected to the movement destination base station (S62).

From the above, according to the fourth embodiment, in the wireless communication system, it is possible to swiftly adjust the transmission power of a base station and to effectively reduce the power consumption of the entire system.

In addition, while, in the fourth embodiment, it is assumed that the movement velocity of the wireless terminal is acquired from the fading frequency estimated in the fading estimation unit 125 in the base station 120, the base station 120 may be notified, using signaling, of, for example, information relating to the movement velocity measured in the wireless terminal, the information relating to the movement velocity, given notice of, may be extracted in the signaling extraction unit 127, and the offset control unit 130 may be notified of the extracted information relating to the movement velocity.

In addition, the wireless communication systems of the first to fourth embodiments may be realized as, for example, LTE systems or LTE-A systems. In addition, it is possible to apply to a wireless communication system utilizing a communication method other than LTE or LTE-A.

In addition, the first to fourth embodiments may be applied to mobile terminals such as a mobile phone, a smartphone, and a PDA (Personal Digital Assistant), as wireless terminals. In addition, in addition to those, the first to fourth embodiments may be applied to various communication devices such as mobile relay stations, which perform communication with base stations.

In addition, the first to fourth embodiments may be applied to base stations of various sizes such as a macro base station and a femto base station, as the base stations. In addition, in addition to those, the first to fourth embodiments may be applied to various communication devices such as relay stations, which perform communication with mobile stations.

In addition, while it is assumed that, in each of the first to fourth embodiments, the notification of information and a parameter between base stations is performed through the wired network while the notification is routed through the network device and the network, the notification of information and a parameter may be directly performed between base stations by wireless communication.

In addition, while it is assumed that, in each of the first to fourth embodiments, the offset cancellation parameter is calculated in a base station (base station neighboring a transmission-power-reduced base station) connected to a wireless terminal, the offset cancellation parameter may be calculated in, for example, the network device. In addition, the wireless terminal is notified of, for example, an offset amount, and the offset cancellation parameter may be calculated in the wireless terminal.

In addition, while it is assumed that, in each of the first to fourth embodiments, the determination of whether or not to request to cancel the offset is performed in the wireless terminal, the determination may be performed in, for example, the base station or the network device. In this case, the wireless terminal notifies a base station (a base station neighboring a transmission-power-reduced base station) connected to the wireless terminal, or the network device, of the measurement result of the reception power of the reference signal of the own cell or the measurement result of the reception power of the reference signal of the own cell. In addition, in this case, information relating to the offset or the offset cancellation parameter is allowed not to be transmitted to the wireless terminal.

In addition, a specific condition of the distribution or integration of individual configuration elements in the base station or the wireless terminal is not limited to the first to fourth embodiments, and all or part thereof may be functionally or physically integrated or distributed in arbitrary units in accordance with various loads and various statuses of use. For example, the memory may be connected as an external device of the base station or the wireless terminal, through a network or a cable.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication method comprising:
   transmitting, by a base station, a signal subjected to reduction of transmission power that is reduced compared with specific transmission power of the base station;
   transmitting, by the base station, information indicating a degree of the reduction of the transmission power of the base station;
   receiving, by a wireless terminal, the information transmitted from the base station;
   determining, by the wireless terminal, when the wireless terminal detects the signal of the base station, whether or not the wireless terminal transmits a reduction cancellation request to the base station based on the information and a reception level of the signal of the base station, the reduction cancellation request being used for cancelling the reduction of the transmission power in the base station; and
   transmitting, by a wireless terminal, the reduction cancellation request to the base station when it is determined that the wireless terminal transmits a reduction cancellation request.

2. The wireless communication method according to claim 1, wherein
   the determining includes giving notice of, by the wireless terminal wirelessly connected to another base station neighboring the base station, when the wireless terminal detects a signal of the base station based on information for identifying the base station acquired through the another base station, the reduction cancellation request to the base station based on information indicating said degree of the reduction of the transmission power of the base station and reception power of the signal of the base station.

3. The wireless communication method according to claim 2, wherein the notice of the reduction cancellation request is transmitted to the base station through the another base station.

4. The wireless communication method according to claim 1, further comprising:
performing the reduction of the transmission power in the base station in a case where there is no wireless terminal wirelessly connected to the base station or a case where a state in which there is no wireless terminal wirelessly connected to the base station continues for a given time period or more.

5. The wireless communication method according to claim 2, further comprising:
acquiring, from the information indicating said degree of the reduction, a reduction cancellation parameter of the base station for determining whether or not to notify the base station of the reduction cancellation request;
notifying the wireless terminal wirelessly connected to the another base station of the reduction cancellation parameter; and
giving notice of, by the wireless terminal wirelessly connected to the another base station, the reduction cancellation request to the base station, based on the reduction cancellation parameter of the base station and the reception power of the signal of the base station.

6. The wireless communication method according to claim 5, further comprising:
notifying the wireless terminal wirelessly connected to the another base station of the reduction cancellation parameter of the base station, as a handover parameter for determining whether or not to notify the base station of a handover request; and
giving notice of, by the wireless terminal wirelessly connected to the another base station, the handover request to the base station, based on the handover parameter of the base station and the reception power of the signal of the base station;
cancelling the reduction of the transmission power in the base station by acquiring the handover request; and
executing a handover procedure in the base station, in response to the handover request.

7. The wireless communication method according to claim 1, further comprising:
performing the reduction of the transmission power in the base station, in a case where communication qualities of all wireless terminals wirelessly connected to the base station are greater than or equal to a given value or a case where a state in which the communication qualities of all the wireless terminals wirelessly connected to the base station are greater than or equal to the given value continues for a given time period or more.

8. The wireless communication method according to claim 1, further comprising:
giving notice of, by the wireless terminal wirelessly connected to the base station, the reduction cancellation request to the base station, when the wireless terminal wirelessly connected to the base station receives the transmitted signal subjected to the reduction of the transmission power and a communication quality of the wireless terminal wirelessly connected to the base station becomes less than a given value.

9. The wireless communication method according to claim 1, further comprising:
cancelling the reduction of the transmission power in the base station, in response to the reduction cancellation request.

10. The wireless communication method according to claim 1, further comprising:
discarding the reduction cancellation request given notice of by the wireless terminal wirelessly connected to another base station neighboring the base station and not cancelling the reduction of the transmission power in the base station, in a case where a movement velocity of the wireless terminal wirelessly connected to the another base station does not satisfy a given condition.

11. The wireless communication method according to claim 10, wherein
the discarding includes discarding the reduction cancellation request given notice of by the wireless terminal wirelessly connected to the another base station, in a case where the movement velocity is greater than or equal to a given threshold value.

12. A wireless communication system comprising:
a base station configured to transmit a signal subjected to reduction of transmission power that is reduced compared with specific transmission power of the base station and the base station further configured to transmit information indicating a degree of the reduction of the transmission power of the base station; and
a wireless terminal configured to receive the information transmitted by the base station and to determine, when the wireless terminal detects the signal of the base station, whether or not the wireless terminal transmits a reduction cancellation request to the base station based on the information and a reception level of the signal of the base station in case of detecting the signal of the base station, the reduction cancellation request being used for cancelling the reduction of the transmission power, and the wireless terminal is further configured to transmit the reduction cancellation request to the base station when it is determined that the wireless terminal transmits a reduction cancellation request.

13. A base station comprising:
a transmitter configured to transmit a signal subjected to reduction of transmission power that is reduced compared with specific transmission power of the base station, said transmitter further configured to transmit information indicating a degree of the reduction of the transmission power of the base station; and
a controller configured to cancel the reduction of the transmission power in response to a reduction cancellation request to the base station for cancelling the reduction the transmission power, the request being given notice of based on information indicating a degree of the reduction of the transmission power of the base station and a reception level of the signal of the base station by a wireless terminal that detects the signal of the base station.

14. A wireless terminal comprising:
a receiver configured to receive information indicating a degree of the reduction of the transmission power of the base station and to detect a signal transmitted from a base station, the signal being subjected to reduction of transmission power that is reduced compared with specific transmission power of the base station; and a controller configured to determine, when the receiver detects the signal of the base station, whether or not the wireless terminal transmits a reduction cancellation request to the base station based on the information and a reception level of the signal of the base station in case of detecting the signal of the base station, the request being used for cancelling the reduction of the transmission power in the base station, the controller is further configured to transmit the reduction cancellation request to the base station when it is determined that the wireless terminal transmits a reduction cancellation request.

* * * * *